United States Patent
Choi et al.

(10) Patent No.: US 11,973,935 B2
(45) Date of Patent: *Apr. 30, 2024

(54) METHOD AND DEVICE FOR ENCODING OR DECODING IMAGE BY USING BLOCKS DETERMINED BY MEANS OF ADAPTIVE ORDER

(71) Applicant: SAMSUNG ELECTRONICS CO., LTD., Suwon-si (KR)

(72) Inventors: Ki-ho Choi, Seoul (KR); Min-woo Park, Yongin-si (KR); Elena Alshina, Suwon-si (KR); Chan-yul Kim, Bucheon-si (KR); In-kwon Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

This patent is subject to a terminal disclaimer.

(21) Appl. No.: 17/696,519

(22) Filed: Mar. 16, 2022

(65) Prior Publication Data
US 2022/0210406 A1    Jun. 30, 2022

Related U.S. Application Data

(63) Continuation of application No. 16/939,642, filed on Jul. 27, 2020, which is a continuation of application
(Continued)

(51) Int. Cl.
*H04N 19/105* (2014.01)
*H04N 19/119* (2014.01)
(Continued)

(52) U.S. Cl.
CPC ......... *H04N 19/105* (2014.11); *H04N 19/122* (2014.11); *H04N 19/129* (2014.11);
(Continued)

(58) Field of Classification Search
CPC .......................... H04N 19/176; H04N 19/46
See application file for complete search history.

(56) References Cited

U.S. PATENT DOCUMENTS 9,137,536 B2   9/2015   Jung et al.
9,414,056 B2   8/2016   Seregin et al.
(Continued)

FOREIGN PATENT DOCUMENTS

CN   102948145 A   2/2013
CN   103718551 A   4/2014
(Continued)

OTHER PUBLICATIONS

Communication issued by the China National Intellectual Property Administration dated Jan. 20, 2023 for Chinese Patent Application No. 202111271353.1.
(Continued)

*Primary Examiner* — Francis Geroleo
(74) *Attorney, Agent, or Firm* — Sughrue Mion, PLLC

(57) ABSTRACT

Provided is a method of decoding a video according to an embodiment, the method including determining at least one processing block for splitting the video; determining an order of determining at least one largest coding unit in the at least one processing block; determining at least one largest coding unit on the basis of the determined order; and decoding the determined at least one largest coding unit, wherein the order is one of a plurality of orders for determining a largest coding unit.

3 Claims, 28 Drawing Sheets

Related U.S. Application Data

No. 15/573,216, filed as application No. PCT/KR2016/004839 on May 10, 2016, now Pat. No. 10,785,476.

(60) Provisional application No. 62/160,247, filed on May 12, 2015.

(51) Int. Cl.
   *H04N 19/122*  (2014.01)
   *H04N 19/129*  (2014.01)
   *H04N 19/13*   (2014.01)
   *H04N 19/176*  (2014.01)
   *H04N 19/44*   (2014.01)
   *H04N 19/46*   (2014.01)

(52) U.S. Cl.
   CPC ........... *H04N 19/13* (2014.11); *H04N 19/176* (2014.11); *H04N 19/44* (2014.11); *H04N 19/119* (2014.11); *H04N 19/46* (2014.11)

(56) References Cited

U.S. PATENT DOCUMENTS

| | | | |
|---|---|---|---|
| 9,736,482 | B2 | 8/2017 | Hendry et al. |
| 10,154,287 | B2 | 12/2018 | Lee et al. |
| 10,412,411 | B2 | 9/2019 | Min et al. |
| 10,863,178 | B2 | 12/2020 | Hendry et al. |
| 2012/0106622 | A1 | 5/2012 | Huang et al. |
| 2012/0106652 | A1 | 5/2012 | Huang et al. |
| 2012/0106861 | A1 | 5/2012 | Pan et al. |
| 2012/0163455 | A1 | 6/2012 | Zheng et al. |
| 2013/0003857 | A1* | 1/2013 | Yu ................... H04N 19/63 375/240.18 |
| 2013/0016769 | A1* | 1/2013 | Chen ................ H04N 19/46 375/E7.132 |
| 2013/0016788 | A1* | 1/2013 | Oh .................... H04N 19/18 375/E7.123 |
| 2013/0188717 | A1 | 7/2013 | Chen et al. |
| 2014/0254670 | A1 | 9/2014 | Kwon et al. |
| 2014/0269924 | A1 | 9/2014 | Km et al. |
| 2014/0341283 | A1 | 11/2014 | Choi et al. |
| 2015/0023406 | A1 | 1/2015 | Lee et al. |
| 2015/0055706 | A1 | 2/2015 | Xu |
| 2015/0131713 | A1 | 5/2015 | Kim et al. |
| 2015/0334414 | A1 | 11/2015 | Oh |
| 2015/0341642 | A1* | 11/2015 | Hendry ............. H04N 19/129 375/240.02 |
| 2016/0373767 | A1 | 12/2016 | Yang et al. |
| 2017/0208326 | A1 | 7/2017 | Lim et al. |
| 2019/0045221 | A1 | 2/2019 | Min et al. |
| 2022/0295076 | A1 | 9/2022 | Chen et al. |

FOREIGN PATENT DOCUMENTS

| | | | | |
|---|---|---|---|---|
| CN | 104396261 | A | 3/2015 | |
| CN | 104509112 | A | 4/2015 | |
| CN | 104539959 | A | 4/2015 | |
| KR | 10-2011-0090065 | A | 8/2011 | |
| KR | 10-2013-0085391 | A | 7/2013 | |
| KR | 10-2015-0034675 | A | 4/2015 | |
| WO | 02/07448 | A1 | 1/2002 | |
| WO | 2012-023796 | A2 | 2/2012 | |
| WO | 2012/096539 | A2 | 7/2012 | |
| WO | WO-2012095030 | A1 * | 7/2012 | ........... H04N 19/119 |
| WO | 2012/163199 | A1 | 12/2012 | |
| WO | 2013/077660 | A1 | 5/2013 | |
| WO | 2013/109122 | A1 | 7/2013 | |

OTHER PUBLICATIONS

Communicated dated Aug. 3, 2022 issued by the National Intellectual Property Administration, PRC in counterpart CN Patent Application No. 202111274127.9.
Communicated dated Aug. 3, 2022 issued by the National Intellectual Property Administration, PRC in counterpart CN Patent Application No. 202111271439.4.
Communicated dated Aug. 3, 2022 issued by the National Intellectual Property Administration, PRC in counterpart CN Patent Application No. 202111271353.1.
Communicated dated Aug. 3, 2022 issued by the National Intellectual Property Administration, PRC in counterpart CN Patent Application No. 202111271349.5.
Communication dated Feb. 2, 2021 by the State Intellectual Property Office of P.R. China in counterpart Chinese Patent Application No. 201680027693.0.
Communication dated Jan. 22, 2018, issued by the European Patent Office in counterpart European Application No. 16792944.7.
Sullivan et al: "Overview of the High Efficiency Video Coding (HEVC) Standard", IEEE Transactions on Circuits and Systems for Video Technology, vol. 22, No. 12, Dec. 2012, pp. 1649-1668, (20 pages total).
Communication dated Aug. 8, 2016, issued by the International Searching Authority in counterpart International Application No. PCT/KR2016/004839.
Communication dated Jun. 15, 2021, issued by the Korean Patent Office in counterpart Korean Patent Application No. 10-2017-7032505.
Crabtree, B. et al., "Equitable quality video streaming", 2009 6th IEEE Consumer Communications and Networking Conference, Feb. 18, 2009. (5 pages total).
Shu-Wei, Sun et al., "An Efficient Parallel Algorithm for H.264/AVC Encoder", Acta Electronica Sinica, Feb. 2009, vol. 37, No. 2. (6 pages total).
Communication dated Apr. 27, 2023 by the National Intellectual Property Administration, PRC in counterpart Chinese Patent Application No. 202111271349.5.
Communication dated Apr. 18, 2023 by the European Patent Office in counterpart European Patent Application No. 20150375.2.
Communication dated Jan. 22, 2024, issued by the Korean Intellectual Property Office in Korean Patent Application No. 10-2023-7028388.

* cited by examiner

PARTITION TYPE (800)

PREDICTION MODE (810)

SIZE OF TRANSFORMATION UNIT (820)

CODING UNIT (1010)

METHOD AND DEVICE FOR ENCODING OR DECODING IMAGE BY USING BLOCKS DETERMINED BY MEANS OF ADAPTIVE ORDER

CROSS REFERENCE TO RELATED APPLICATIONS

This application is a Continuation Application of U.S. application Ser. No. 16/939,642 filed on Jul. 7, 2020, which is a continuation of U.S. patent application Ser. No. 15/573,216, filed Nov. 10, 2017, now U.S. Pat. No. 10,785,476 issued on Sep. 22, 2020, which is a National Stage of International Application No. PCT/KR2016/004839, filed May 10, 2016, which claims priority from U.S. Provisional Application No. 62/160,247, filed May 12, 2015, the disclosures of which are incorporated herein by reference in their entireties.

TECHNICAL FIELD

In methods and apparatuses according to embodiments, a video may be encoded or decoded by determining a largest coding unit in the video in one of a plurality of orders of determining a largest coding unit.

BACKGROUND ART

Video data is encoded using a codec according to a certain data compression standard, e.g., the Moving Picture Expert Group (MPEG) standard, and is recorded on a recording medium in the form of a bitstream or transmitted via a communication channel.

With the development and supply of hardware for reproducing and storing high-resolution or high-quality video content, there is a growing need for a codec for effectively encoding or decoding the high-resolution or high-quality video content. Encoded video content may be reproduced by decoding it. Recently, methods of effectively compressing such high-resolution or high-quality video content have been implemented. For example, an efficient video compression method of processing a video to be encoded is implemented in a certain way.

To compress a video, a data unit such as a largest coding unit may be used. The largest coding unit is determined in a specific order (e.g., a raster scan order) and a size thereof is determined based on information related to a sequence of the video to be encoded. That is, the sizes of largest coding units are uniform in a whole sequence of the video to be encoded or decoded.

DETAILED DESCRIPTION OF THE INVENTION

Technical Problem

In a conventional compression scheme, all largest coding units of a video are uniformly determined in a predetermined order. Thus, largest coding units cannot be efficiently determined when high-resolution video is compressed.

Technical Solution

In order to solve the above-described technical problem, in an embodiment, a method of decoding a video includes determining at least one processing block for splitting the video; determining an order of determining at least one largest coding unit in the at least one processing block; determining at least one largest coding unit on the basis of the determined order; and decoding the determined at least one largest coding unit, wherein the order is one of a plurality of orders of determining a largest coding unit.

Advantageous Effects of the Invention

In a method and apparatus according to an embodiment, a video may be adaptively encoded or decoded by determining an order of determining a largest coding unit in units of processing block units which are random data units among a plurality of orders of determining a largest coding unit without determining largest coding units in a uniform order.

BEST MODE

Figure 1A:
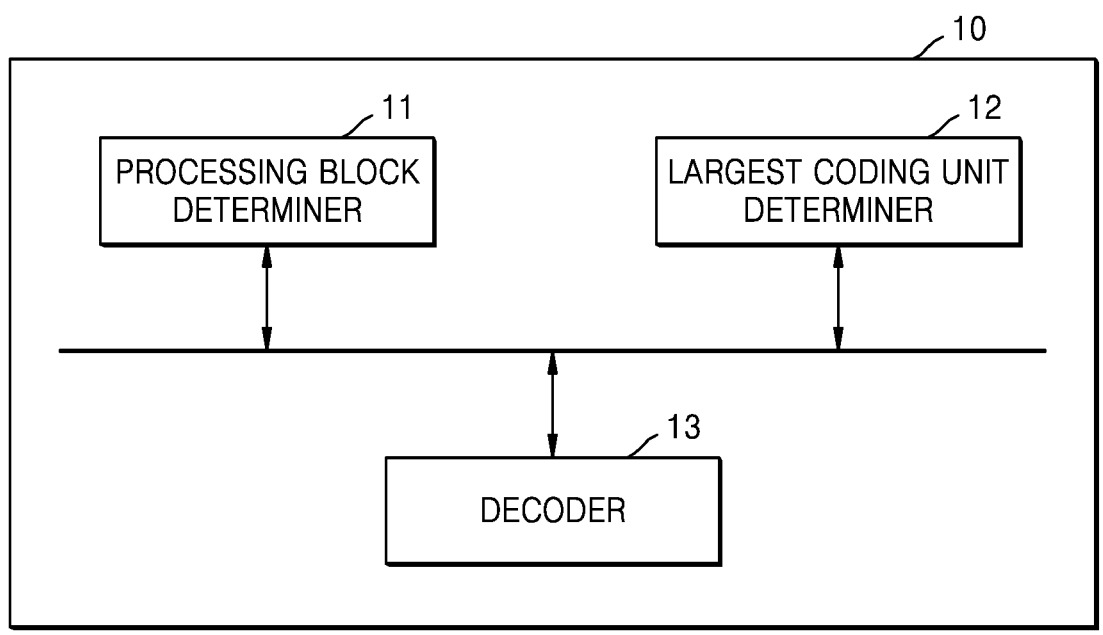
FIG. 1A is a block diagram of a video decoding apparatus according to an embodiment.

In order to solve the above-described technical problem, in an embodiment, a method of decoding a video includes determining at least one processing block for splitting the video; determining an order of determining at least one largest coding unit in the at least one processing block; determining at least one largest coding unit on the basis of the determined order; and decoding the determined at least one largest coding unit, wherein the order is one of a plurality of orders of determining a largest coding unit.

In an embodiment, the determining of the at least one processing block may include obtaining information regarding a size of the at least one processing block; and determining the at least one processing block, based on the information regarding the size of the at least one processing block.

In an embodiment, the determining of the order of determining the at least one largest coding unit may include obtaining information regarding the order of determining the at least one largest coding unit included in the at least one processing block; and determining the order of determining the at least one largest coding unit, based on the information regarding the determined order.

In an embodiment, the decoding of the determined at least one largest coding unit may include selecting one of a plurality of sizes which are smaller than a size of the determined largest coding unit to be a size of a coding unit, based on information regarding the size of the coding unit obtained from a bitstream; and determining at least one coding unit, based on the selected size of the coding unit.

In an embodiment, the decoding of the at least one largest coding unit may include determining at least one coding unit included in a current largest coding unit which is one of the at least one largest coding unit; comparing a size of the at least one coding unit with a size indicated by size limit information of a coding unit obtained from a bitstream, based on the size limit information; and obtaining split information for the at least one coding unit from the bitstream when the size of the at least one coding unit is greater than the size indicated by the size limit information. The size indicated by the size limit information may be greater than a minimum size of the coding unit.

In an embodiment, the obtaining of the split information may include encoding the at least one coding unit without obtaining the split information from the bitstream when the size of the at least one coding unit is equal to or less than the size indicated by the size limit information.

In an embodiment, the decoding of the at least one largest coding unit may include determining at least one coding unit included in a current largest coding unit which is one of the at least one largest coding unit, based on split information of a coding unit obtained from a bitstream. The split information may include at least one of first split information indicating whether a coding unit of a current depth is to be split into coding units of a lower depth in a depth order; and second split information indicating whether the coding unit of the current depth is to be split into a depth lower than the lower depth while skipping splitting the coding unit of the current depth into the lower depth.

In an embodiment, the splitting of the coding unit of the current depth into at least one coding unit may include obtaining the second split information from the bitstream, based on whether the lower depth is a lowermost depth; when the second split information indicates that the coding unit of the current depth is to be split into a depth lower than the lower depth while skipping splitting the coding of the current depth into the lower depth, splitting the coding unit of the current depth into coding units of the depth lower than the lower depth; and when the second split information does not indicate that the coding unit of the current depth is to be split into a depth lower than the lower depth, splitting the coding unit of the current depth in coding units of the lower depth, based on the first split information obtained from the bitstream.

In an embodiment, the decoding of the determined at least one largest coding unit may include determining at least one coding unit included in a current largest coding unit which is one of the at least one largest coding unit, based on at least one of information regarding a maximum depth of a coding unit and information regarding a minimum depth of the coding unit. The information regarding the maximum depth and the information regarding the minimum depth may be obtained from neighboring blocks of the at least one coding unit.

In an embodiment, the determining of the at least one coding unit may include splitting a coding unit of a current depth only when the current depth of the coding unit is a depth which is higher than the maximum depth or a depth which is equal to or lower than the minimum depth.

In an embodiment, the decoding of the determined at least one largest coding unit may include determining at least one coding unit included in a current largest coding unit which is one of the at least one largest coding unit; and determining at least one prediction unit for a current coding unit which is one of the at least one coding unit, based on information indicating a prediction method which is obtained from a bitstream, wherein the information indicating the prediction method may indicate whether prediction is to be performed using a predetermined prediction method.

In an embodiment, the determining of the at least one prediction unit may include obtaining partition-mode information indicating one of a plurality of types of partitions from the bitstream and determining at least one prediction unit included in the current coding unit, when the information indicating the prediction method indicates use of a first method which is the predetermined prediction method; and determining a prediction unit based on a predetermined partition type without obtaining the partition-mode information from the bitstream, when the information indicating the prediction method indicates use of a second method which is not the predetermined prediction method.

In an embodiment, the determining of the prediction unit based on the predetermined partition type may further include determining a prediction unit having the same size as a coding unit of a depth lower than a depth of the current coding unit, when the information indicating the prediction method indicates that the current coding unit has the same size as the current largest coding unit.

In order to solve the above-described technical problem, in an embodiment, an apparatus for decoding a video includes a processing block determiner configured to determine at least one processing block for splitting the video; a largest coding unit determiner configured to determine an order of determining at least one largest coding unit in the at least one processing block, and determine the at least one largest coding unit, based on the determined order; and a decoder configured to decode the determined at least one largest coding unit, wherein the order is one of a plurality of orders of determining a largest coding unit.

In order to solve the above-described technical problem, in an embodiment, an apparatus for encoding a video includes a processing block determiner configured to determine at least one processing block for splitting the video; a largest coding unit determiner configured to determine an order of determining at least one largest coding unit in the at least one processing block, and determine the at least one largest coding unit, based on the determined order; and an encoder configured to encode the determined at least one largest coding unit, wherein the order is one of a plurality of orders of determining a largest coding unit.

Mode of the Invention

Advantages and features of the present invention and methods of achieving them will be apparent with reference to embodiments set forth herein, in conjunction with the accompanying drawings.

The present disclosure may, however, be embodied in many different forms and should not be construed as being limited to the embodiments set forth herein. Rather, these embodiments are provided so that this disclosure will be thorough and complete and will fully convey the concept of the disclosure to those of ordinary skill in the art, and the present disclosure will only be defined by the appended claims.

Hereinafter, terms that are used in the specification will be briefly described, and the present disclosure will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Throughout the specification, a singular form may include plural forms, unless there is a particular description contrary thereto.

Also, throughout the specification, when a part "includes" or "comprises" an element, unless there is a particular description contrary thereto, the part can further include other elements, not excluding the other elements. The term "unit", as used herein, means, but is not limited to, a software or hardware component, such as a Field Programmable Gate Array (FPGA) or Application Specific Integrated Circuit (ASIC), which performs certain tasks. However, the term "unit" is not limited to software or hardware components. A 'unit' may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or may be further separated into additional components and "units".

Hereinafter, the term "video" may be understood to mean a static image such as a still image of a video or a dynamic image such as a moving picture, i.e., a video itself.

Hereinafter, a "sample" refers to data that is assigned to a sampling location of an image and is to be processed. For example, pixel values of an image in a spatial domain and transformation coefficients in a transformation domain may be samples. A unit including such at least one sample may be defined as a block.

The present disclosure will now be described more fully with reference to the accompanying drawings, in which embodiments of the present disclosure are shown. In the drawings, for a more clear description of the present disclosure, parts or units that are not related to the present disclosure are omitted.

FIG. 1A is a block diagram of a video decoding apparatus 10 according to an embodiment. The video decoding apparatus 10 may include a processing block determiner 11, a largest coding unit determiner 12, and a decoder 13. In one embodiment, operations performed by the components included in the video decoding apparatus 10 may be respectively performed by separate hardware or software components or may be performed by one hardware component (e.g., a CPU). The operations performed by the components of the video decoding apparatus 10 will be described in detail in embodiments which will be described below.

Figure 1B:
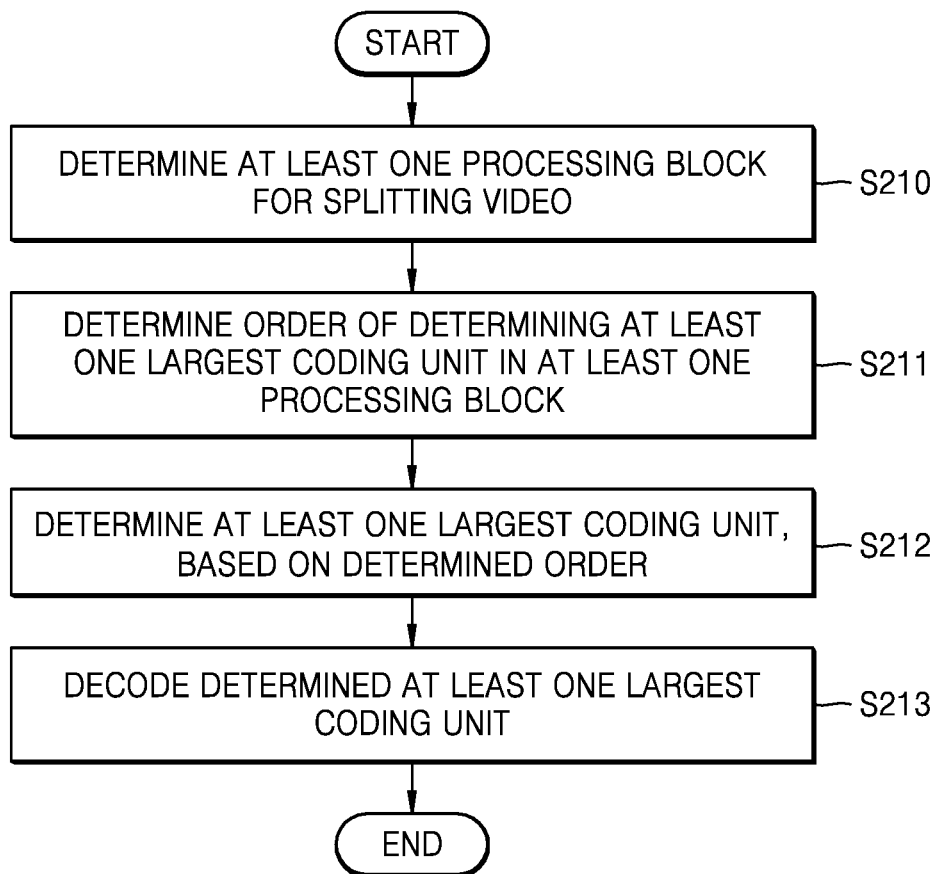
FIG. 1B is a flowchart of a video decoding method performed using a processing block by a video decoding apparatus, according to an embodiment.

FIG. 1B is a flowchart of a video decoding method performed using a processing block by the video decoding apparatus 10, according to an embodiment.

In operation S210, the video decoding apparatus 10 may determine at least one processing block for splitting a video.

In an embodiment, the processing block determiner 11 of the video decoding apparatus 10 may determine at least one processing block for splitting a video into frames. The processing block is a random data unit including the at least one largest coding unit for splitting the video. The at least one largest coding unit included in the processing block may be determined in a specific order. That is, each of orders of determining at least one largest coding unit in processing blocks may be one of various orders of determining a largest coding unit. The orders of determining a largest coding unit in the processing blocks may be different for the processing blocks. The order of determining a largest coding unit in each of the processing blocks may be one or various orders such as a raster scan order, a Z-scan order, an N-scan order, an up-right diagonal scan order, a horizontal scan order, and a vertical scan order but is not limited thereto.

In an embodiment, the video decoding apparatus 10 may determine a size of at least one processing block included in a video by obtaining information regarding a size of a processing block. The video decoding apparatus 10 may determine a size of at least one processing block included in a video by obtaining information regarding a size of a processing block from a bitstream. The size of the processing block may be a specific size of a data unit which is indicated by information regarding the size of the processing block.

In an embodiment, the video decoding apparatus 10 may obtain information regarding a size of a processing block from a bitstream in units of specific data units. For example, the information regarding the size of the processing block may be obtained from the bitstream in units of data units of a video, a sequence, a picture, a slice, a slice segment, or the like. That is, the processing block determiner 11 of the video decoding apparatus 10 may determine a size of at least one processing block for splitting a video by using information regarding processing blocks obtained from a bitstream in various data units. The size of the at least one processing block may be an integral multiple of a size of a largest coding unit.

Figure 3:
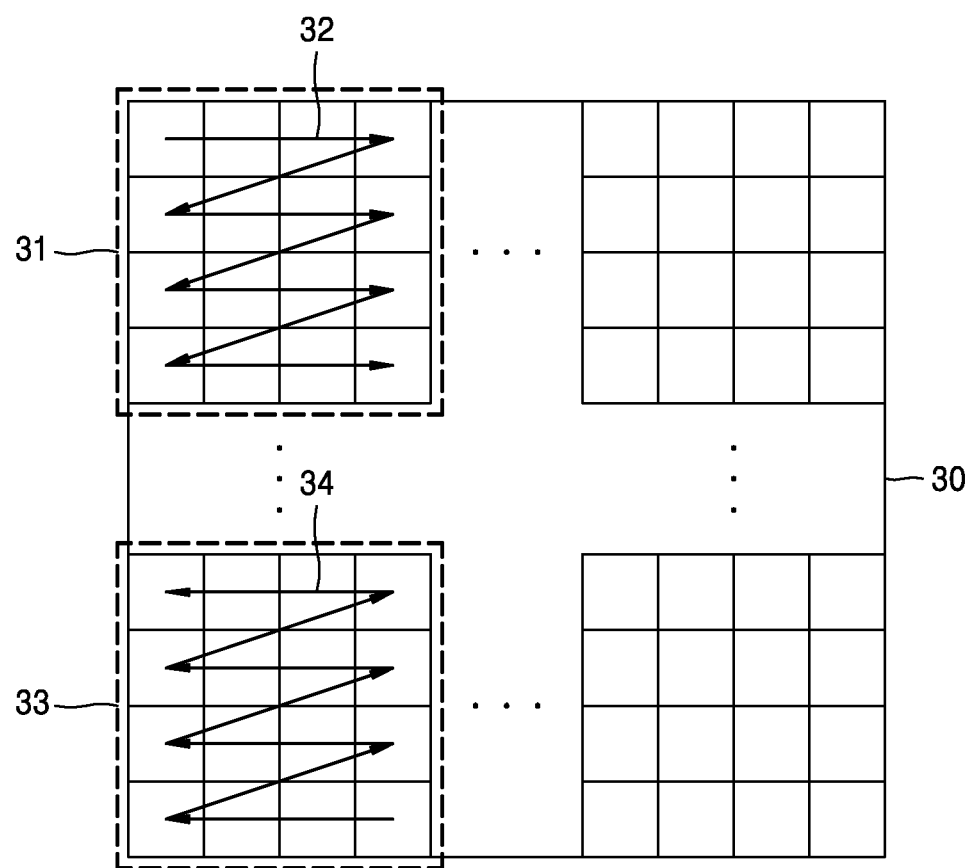
FIG. 3 illustrates an order of determining at least one largest coding unit in at least one processing block included in a picture, according to an embodiment.

FIG. 3 illustrates an order of determining at least one largest coding unit in at least one processing block included in a picture 30, performed by the video decoding apparatus 10, according to an embodiment.

In an embodiment, the processing block determiner 11 of the video decoding apparatus 10 may determine sizes of processing blocks 31 and 33 included in the picture 30. For example, the video decoding apparatus 10 may determine a size of a processing block on the basis of processing-block size information obtained from a bitstream. Referring to FIG. 3, in an embodiment, the video decoding apparatus 10 may determine horizontal sizes of the processing blocks 31 and 33 to be four times that of a largest coding unit and vertical sizes of the processing blocks 31 and 33 to be four times that of the largest coding unit. In operation S211, the video decoding apparatus 10 may determine an order of determining at least one largest coding unit in at least one processing block.

In an embodiment, in operation S210, the video decoding apparatus 10 may determine the processing blocks 31 and 33 included in the picture 30 on the basis of the sizes of processing blocks 31 and 33 determined by the processing block determiner 11, and the largest coding unit determiner 12 may determine an order of determining at least one largest coding unit included in the processing blocks 31 and 33. In an embodiment, the determining of the at least one largest coding unit may include determining a size of the at least one largest coding unit.

In an embodiment, the video decoding apparatus 10 may obtain information regarding the order of determining at least one largest coding unit in at least one processing block from the bitstream, and determine the order of determining at least one largest coding unit in at least one processing block on the basis of the information regarding the determined order. The information regarding the determined order may be defined as an order or direction of determining largest coding units in a processing block. That is, an order of determining largest coding units may be determined independently for each processing block.

In an embodiment, the video decoding apparatus 10 may obtain information regarding an order of determining a largest coding unit for each specific data unit from the bitstream. For example, the information regarding the order of determining a largest coding unit may be obtained from the bitstream in a unit of a video, a sequence, a picture, a slice, a slice segment, or a processing block. The information regarding the order of determining a largest coding unit represents an order of determining a largest coding unit in a processing block and may be thus obtained for each specific data unit including an integer number of processing blocks.

In an embodiment, in operation S212, the video decoding apparatus 10 may determine at least one largest coding unit on the basis of the determined order.

In an embodiment, the largest coding unit determiner 12 of the video decoding apparatus 10 may determine at least one largest coding unit included in the picture 30 by determining at least one largest coding unit included in the processing blocks 31 and 33 by obtaining the information regarding the order of determining the largest coding unit as information related to the processing blocks 31 and 33 from the bitstream. Referring to FIG. 3, the largest coding unit determiner 12 of the video decoding apparatus 10 may determine orders 32 and 34 of determining at least one largest coding unit related to each of the processing blocks 31 and 33. For example, when information regarding an order of determining a largest coding unit is obtained for each processing block, an order of determining a largest coding unit related to the processing blocks 31 and 33 may be different for each processing block. When the order 32 of determining a largest coding unit related to the processing block 31 is the raster scan order, a largest coding unit included in the processing block 31 may be determined in the raster scan order. In contrast, when the order 34 of determining a largest coding unit related to the processing block 33 is an order reverse to the raster scan order, a largest coding unit included in the processing block 33 may be determined in the order reverse to the raster scan order.

In an embodiment, in operation S213, the video decoding apparatus 10 may decode the determined at least one largest coding unit. The decoder 13 of the video decoding apparatus 10 may decode a video on the basis of the at least one largest coding unit determined in operation S212. A method of decoding a largest coding unit may include various methods of decoding a video.

Figure 4A:
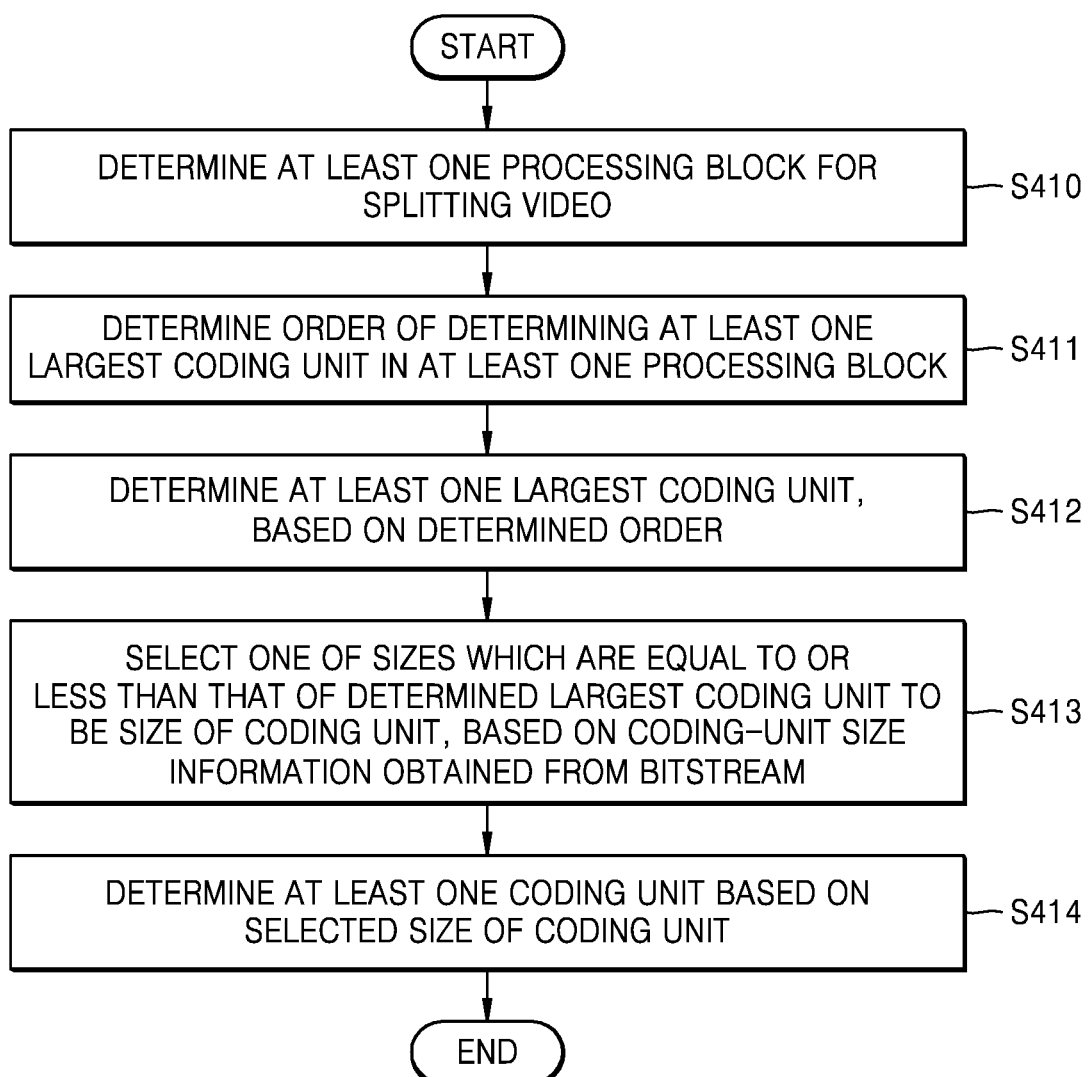
FIG. 4A is a flowchart of a process of determining at least one coding unit included in a largest coding unit, according to an embodiment.

FIG. 4A is a flowchart of a process of determining at least one coding unit included in a largest coding unit, performed by the video decoding apparatus 10, according to an embodiment.

In an embodiment, operations S410 to S412 performed by the video decoding apparatus 10 may correspond to operations S210 to 212 performed by the video decoding apparatus 10 which are described above with reference to FIG. 1B and are thus not described in detail here.

In an embodiment, the decoder 13 of the video decoding apparatus 10 may determine a largest coding unit included in a processing block in an order determined in relation to the processing block, and determine at least one coding unit on the basis of the determined largest coding unit. In an embodiment, the determining of the at least one coding unit may include determining a size of the at least one coding unit which is equal to or less than that of the largest coding unit.

In an embodiment, in operation S413, the video decoding apparatus 10 may select one of a plurality of sizes which are equal to or less than that of the determined largest coding unit to be a size of a coding unit on the basis of coding-unit size information obtained from a bitstream.

In an embodiment, the video decoding apparatus 10 may obtain the coding-unit size information from the bitstream. The coding-unit size information may include information regarding a shape or size of at least one coding unit included in the largest coding unit. For example, in order to select one of coding-unit sizes which are equal to or less than a size of the largest coding unit, coding-unit size information regarding the split of a horizontal or vertical size of the largest coding unit may be used. If the largest coding unit has a size of 64×64, sizes of coding units which are equal to or less than that of the largest coding unit may be 64×64, 32×32, 16×16, 8×8, etc. Thus, in this case, the coding-unit size information may indicate one of a plurality of sizes, e.g., 64×64, 32×32, 16×16, 8×8, etc., which are equal to or less than the size, i.e., 64×64, of the largest coding unit, and the video decoding apparatus 10 may determine at least one coding unit in the largest coding unit by selecting a coding unit size indicated by the coding-unit size information.

Figure 4B:
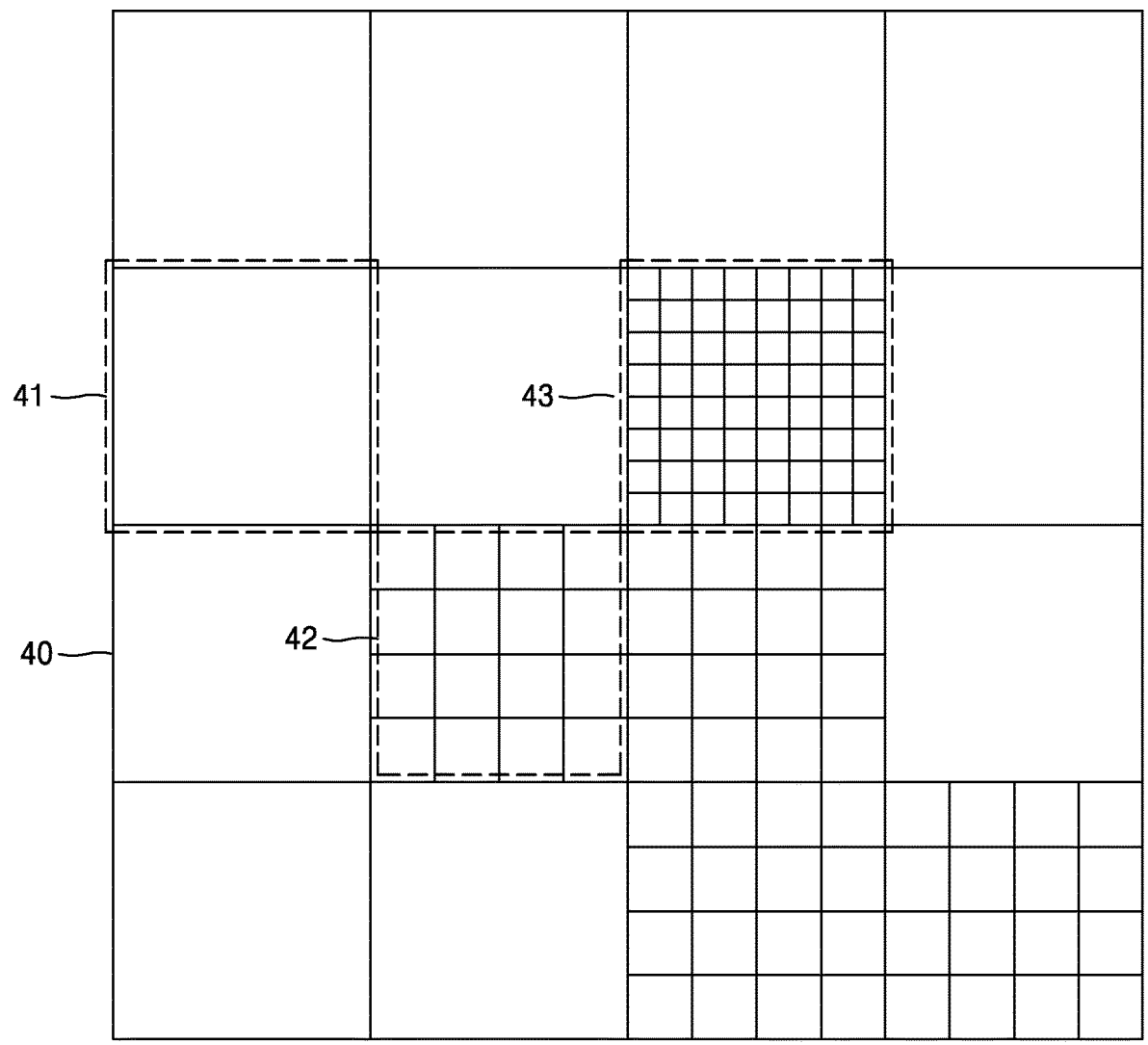
FIG. 4B illustrates a process of determining a size of at least one coding unit included in a picture, according to an embodiment.

FIG. 4B illustrates a process of determining a size of at least one coding unit included in a picture 40, performed by the video decoding apparatus 10, according to an embodiment.

In an embodiment, the largest coding unit determiner 12 of the video decoding apparatus 10 may determine at least one largest coding unit included in the picture 40. Each of the at least one largest coding unit may be split into at least one coding unit. The decoder 13 of the video decoding apparatus 10 may determine at least one coding unit included in the at least one largest coding unit on the basis of coding-unit size information obtained from a bitstream. The video decoding apparatus 10 may split each of the at least one largest coding unit into at least one coding unit on the basis of the coding-unit size information obtained from the bitstream. Sizes of such coding units may be independently determined for each of the at least one largest coding unit. In an embodiment, the coding-unit size information may be obtained for each specific data unit (e.g., a picture, a processing block, a slice, a slice segment, or a largest coding unit) from a bitstream. For convenience of explanation, it will be assumed that coding-unit size information is obtained for each of the at least one largest coding unit from a bitstream by the video decoding apparatus 10.

Referring to FIG. 4B, in an embodiment, the decoder 13 of the video decoding apparatus 10 may determine a coding unit 41 having the same size as the at least one largest coding unit or split the at least one largest coding unit into coding units 42 or 43 which are smaller than the at least one largest coding unit. The video decoding apparatus 10 may obtain coding-unit size information for each of the at least one largest coding unit from the bitstream. Referring to FIG. 4B, the video decoding apparatus 10 may select one of coding-unit sizes that may be determined for each of the at least one largest coding unit on the basis of the coding-unit size information obtained from the bitstream, and determine at least one coding unit for each of the at least one largest coding unit according to the selected coding unit size.

In an embodiment, coding-unit sizes which may be indicated by the coding-unit size information obtained from the bitstream by the video decoding apparatus 10 may be equal to or less than the size of the at least one coding unit. The coding-unit sizes may be equal to the size of the at least one largest coding unit or may be ½n times than the horizontal or vertical size of the at least one largest coding unit (here, n represents an integer). Furthermore, the coding-unit sizes which may be indicated by the obtained coding-unit size information may include all sizes obtained by sequentially splitting the size of the at least one largest coding unit according to depths but may not include sizes obtained by splitting the size of the at least one largest coding unit according to a specific depth, as will be described in detail below.

Figure 4C:
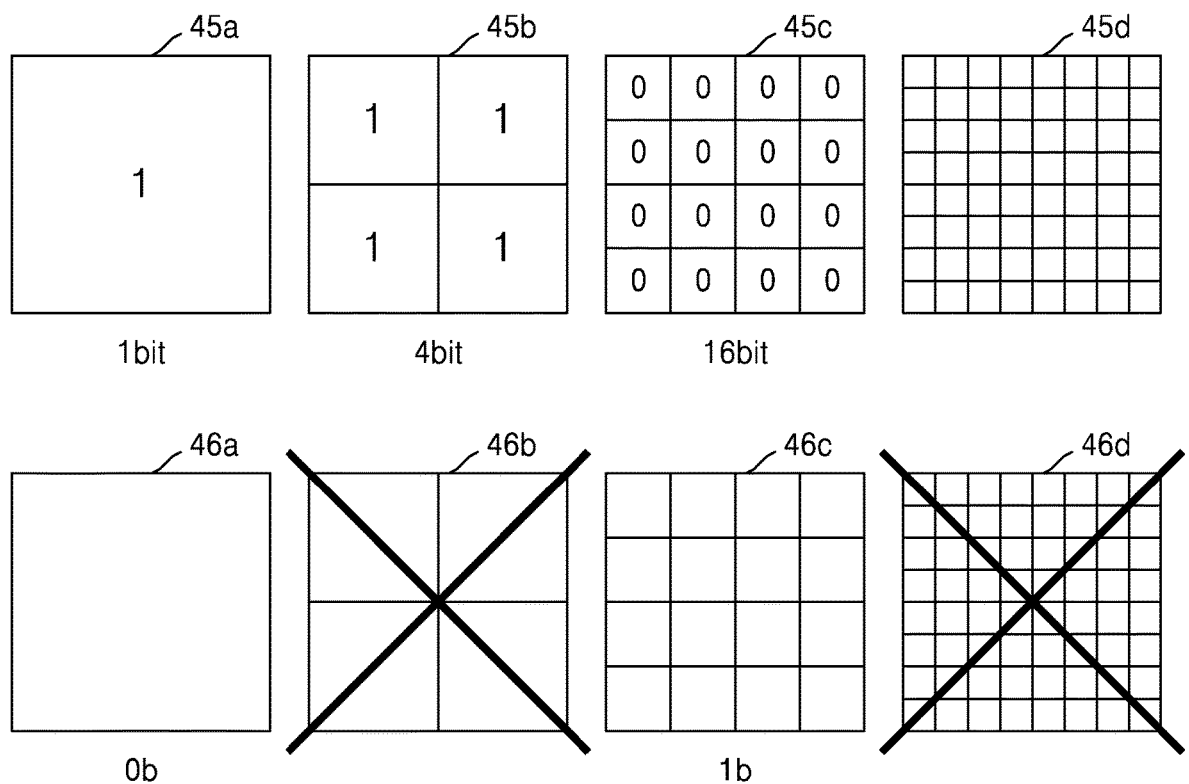
FIG. 4C illustrates coding-unit sizes which may be indicated by coding-unit size information, according to an embodiment.

FIG. 4C illustrates coding-unit sizes which may be indicated by coding-unit size information by the video decoding apparatus 10, according to an embodiment.

In an embodiment, when the video decoding apparatus 10 uses the coding-unit size information, a process of determining a coding unit by recursively splitting a largest coding unit on the basis of split information is not needed and the largest coding unit may be directly split into the coding-unit sizes indicated by the coding-unit size information. Thus, the coding-unit sizes which may be indicated by the coding-unit size information may include all sizes, including a size of a largest coding unit corresponding to an uppermost depth and sizes obtained by sequentially splitting the largest coding unit to a lower depth to a lowermost depth. At least one size between the size corresponding to the uppermost depth and a size corresponding to the lowermost depth may be omitted. The uppermost depth may represent a depth of a coding unit having the same size as a maximum size of a coding unit, i.e., a size of a largest coding unit. The lowermost depth may represent a depth of a coding unit having a minimum size.

Referring to FIG. 4C, the decoder 13 of the video decoding apparatus 10 may determine at least one coding unit included in a largest coding unit determined by the largest coding unit determiner 12, and may use the coding-unit size information during determination of a coding unit. For example, when a largest coding unit has a size of 64×64, the coding-unit size information may represent 64×64 which is a size of coding units 45a and 46a of an uppermost depth and is the same size as the largest coding unit, 32×32 which is a size of coding units 45b and 46b which is ¼ times the size of the largest coding unit, 16×16 which is a size of coding units 45c and 46c which is ¹⁄₁₆ times the size of the largest coding unit, or 8×8 which is a size of coding units 45d and 46d of a lowermost depth and which is ¹⁄₆₄ times the size of the largest coding unit.

In an embodiment, the coding-unit size information may represent one of all sizes of lowermost depths (64×64, 32×32, 16×16 and 8×8) in consideration of all sizes of the lowermost depths (64×64, 32×32, 16×16 and 8×8), starting from a size of an uppermost depth, or may represent one of some sizes. Referring to FIG. 4C, the video decoding apparatus 10 may obtain, from a bitstream, coding-unit size information representing one of the size of the uppermost depth and the sizes of the lowermost depths (46a, 46b, 46c, and 46d) excluding some sizes thereof. For example, when a largest coding unit has a size of 64×64, the video decoding apparatus 10 may obtain coding-unit size information representing one of some sizes (e.g., 64×64 and 16×16) from a bitstream and the decoder 13 may determine at least one coding unit included in the largest coding unit on the basis of the coding-unit size information.

In a conventional video encoding or decoding method, a size of a coding unit is determined for each largest coding unit according to a recursive method (e.g., a method of splitting a largest coding unit into coding units of a lower depth by using a quad tree). Thus, split information is obtained from a bitstream to determine whether each coding unit of a current depth is to be split into coding units of a lower depth. However, according to features of a video, it may be inefficient to determine whether each coding unit is to be split by obtaining the split information therefor from the bitstream. Thus, in an embodiment, a size of a coding unit included in each largest coding unit may be determined using coding-unit size information which may be obtained for each largest coding unit rather than obtaining split information for each coding unit to split a size of a coding unit related to a largest coding unit according to the recursive method. Referring to FIG. 4C, for the coding units 45*a*, 45*b*, 45*c*, and 45*d* using split information, the split information is obtained from a bitstream to determine whether the coding units are to be split from a current depth to a lower depth. In this case, the amount of data to be obtained from the bitstream increases to be proportional to the number of the coding units. For example, in order to split the 64×64 coding unit 45*a* of the uppermost depth into the 16×16 coding units 45*c* of a lower depth, split information for one coding unit 45*a* of an uppermost depth (e.g., a depth 0), split information for four coding units 45*b* of a lower depth (e.g., a depth 1), and split information for sixteen coding units 45*c* of a lower depth (e.g., a depth 2) should be obtained from the bitstream to determine whether these coding units are to be split. Thus, at least 21-bit data should be obtained from the bitstream. However, according to features of a video, it is efficient not to obtain, from the bitstream, split information of coding units of depths which need not be checked to determine as to whether they are to be split (e.g., the split information of the coding units 45*b* and 45*d*).

In an embodiment, when split information regarding sizes of coding units which is obtained from a bitstream in relation to a largest coding unit is used, only the amount of bits needed to express sizes of predetermined coding units which may be included in largest coding unit may be used as the split information, thereby reducing unnecessary bits. For example, when the coding-unit size information is set to indicate only one size among 64×64 and 16×16, only the two sizes, i.e., 64×64 and 16×16, needed to be identified and thus only 1 bit is needed. For example, the decoder 13 of the video decoding apparatus 10 may determine a coding unit having a size of 64×64 when coding-unit size information obtained in relation to a specific largest coding unit is 0b and determine a coding unit having a size of 16×16 when the coding-unit size information obtained in relation to the specific largest coding unit is 1b. In an embodiment, "0b" or "1b" may be understood to mean 0 bits or 1 bit expressed in the form of a binary number. The sizes and number of coding units indicated by the coding-unit size information described above are merely examples and are thus not limited thereto.

In an embodiment, sizes or a number of coding units which may be indicated by coding-unit size information obtained by the video decoding apparatus 10 may be independently determined for each data unit. For example, sizes or a number of coding units which may be indicated by the coding-unit size information may be independently determined in units of pictures, slices, slice segments, tiles, or processing blocks. Although sizes or a number of coding units which may be indicated by the coding-unit size information may be differently set for each data unit, the data unit should not be construed to being the types of data units described above and various other data units may be used.

Figure 5A:
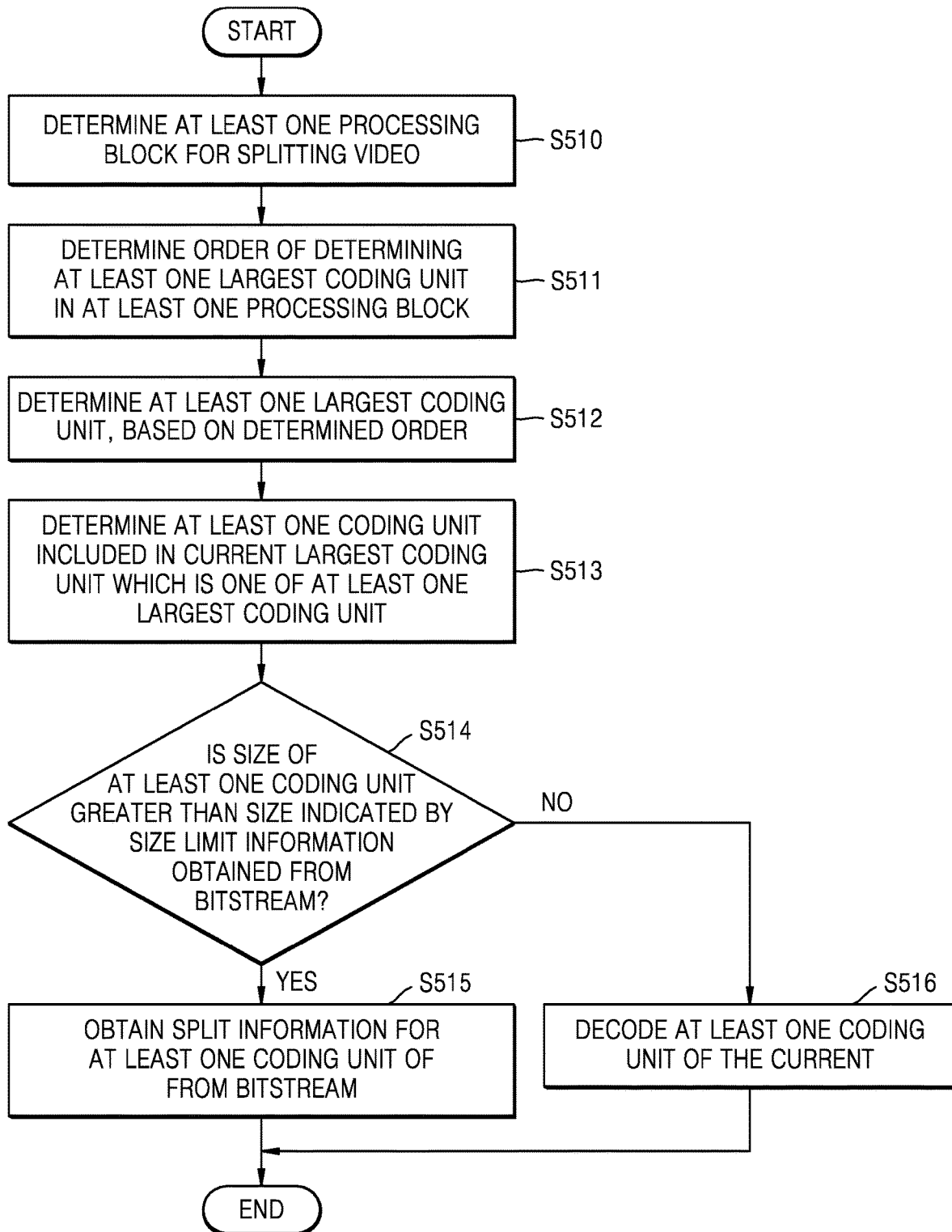
FIG. 5A is a flowchart of a process of determining whether split information of a coding unit is obtained on the basis of size limit information, according to an embodiment.

FIG. 5A is a flowchart of determining whether split information of a coding unit is to be obtained from a bitstream on the basis of size limit information obtained from the bitstream, performed by the video decoding apparatus 10, according to an embodiment.

In an embodiment, operations S510 to S512 performed by the video decoding apparatus 10 may correspond to the operations described above with reference to FIG. 1B and are not thus described in detail here.

In an embodiment, in operation S513, the video decoding apparatus 10 may determine at least one coding unit included in a current largest coding unit which is one of largest coding units determined in operation S512. In an embodiment, the determining of the at least one coding unit included in the current largest coding unit may be implemented through operations S413 and S414 of FIG. 4A performed by the decoder 13 of the video decoding apparatus 10 or may be implemented in other various ways in the corresponding technical field. In an embodiment, a decoding process performed by the decoder 13 may include a video decoding method which will be described below.

In an embodiment, in operation S514, the video decoding apparatus 10 may compare a size of the at least one coding unit with a size indicated by size limit information on the basis of coding-unit size limit information obtained from a bitstream. In an embodiment, the size limit information may include information for determining whether a coding unit is to be split to a lower depth. For example, when a size indicated by size limit information for the current coding unit and a size of the current coding unit are compared with each other, whether the current coding unit is to be split into a lower depth may be determined according to a result of the comparison.

In an embodiment, information indicated by the size limit information obtained from the bitstream by the video decoding apparatus 10 may be information for determining whether the current coding unit is to be split into a lower depth and may represent a size which is greater than a minimum size of a coding unit. That is, when the size of the current coding unit is a minimum size which a coding unit may have, whether the current coding unit is to be split into coding units of a lower depth need not be determined. However, even if the size of the current coding unit is not a minimum size, whether the current coding unit is to be split into coding units of a lower depth may not be needed to be determined according to features of a video. In this case, it may be inefficient to obtain split information related to the current coding unit from the bitstream. Thus, in an embodiment, the decoder 13 of the video decoding apparatus 10 may determine whether the current coding unit is to be split into coding units of a lower depth by comparing sizes of the coding units of the current depth with the size limit information obtained from the bitstream even when split information for each of coding units of a current depth is not obtained from the bitstream.

Figure 5B:
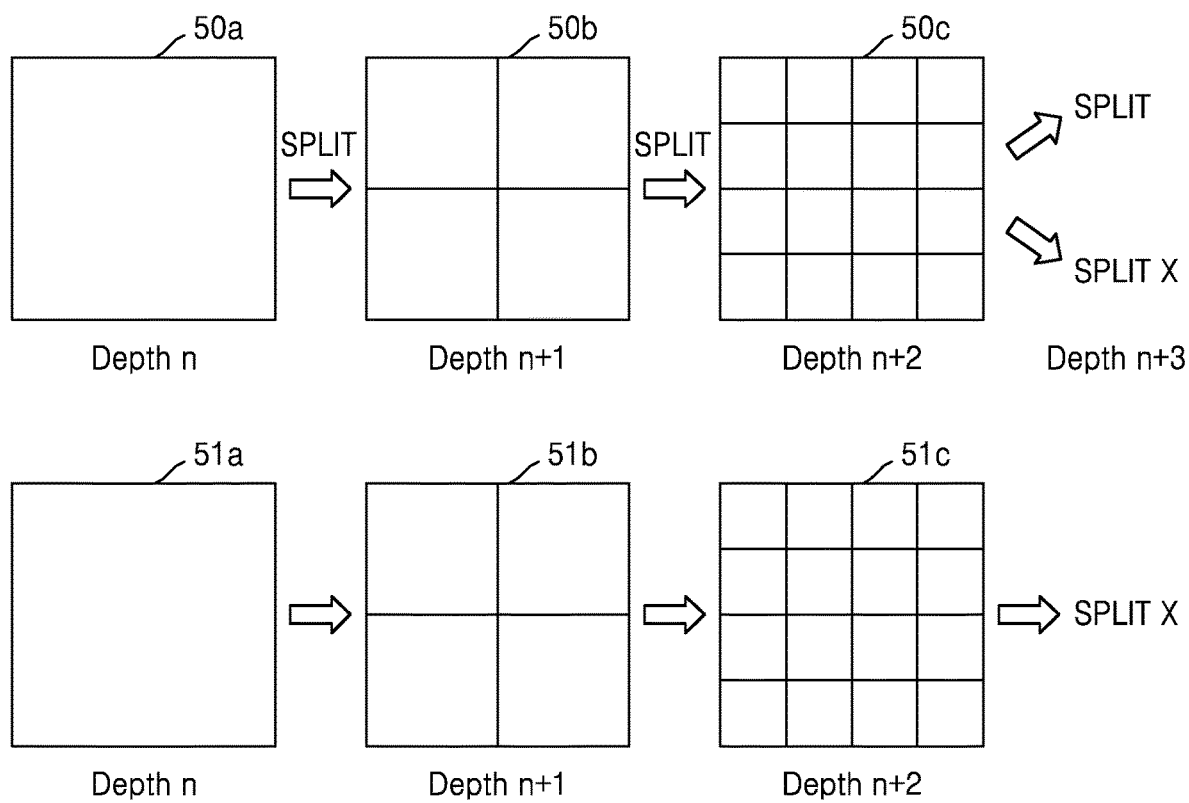
FIG. 5B illustrates a process of determining at least one coding unit on the basis of size limit information, according to an embodiment.

FIG. 5B illustrates a process of determining at least one coding unit on the basis of size limit information, performed by the video decoding apparatus 10, according to an embodiment.

In an embodiment, the decoder 13 of the video decoding apparatus 10 may determine at least one coding unit on the basis of size limit information obtained from a bitstream. When a comparison of a size of a coding unit indicated by the size limit information and a size of a coding unit of a current depth reveals that the size of the coding unit of the current depth is greater than the size of the coding unit indicated by the size limit information, the decoder 13 may split the coding unit of the current depth into coding units of a lower depth. Referring to FIG. 5B, in an embodiment, the video decoding apparatus 10 may obtain size limit information indicating that 16×16 is a minimum size for determining whether a coding unit is to be split into a lower depth. When a coding unit 51a of an uppermost depth (a depth n) has a size of 64×64, the coding unit 51a may be split into a lower depth (e.g., a depth n+1, a depth n+2, a depth n+3, . . . ) but split information for a coding unit having a size of 16×16 indicated by the size limit information is not obtained from the bitstream to determine whether the coding unit is to be split into a lower depth. For example, as the 64×64 coding unit 51a of the uppermost depth (the depth n) is recursively split into coding units 50b and 50c of lower depths (the depth n+1 and the depth n+2), split information for the coding units of the respective depths (the depth n, the depth n+1, and the depth n+2) may be obtained from the bitstream. Whether these coding units are to be split into lower depths may be determined on the basis of the split information therefor. According to features of a video, there is no need to split a coding unit into coding units having a size of 8×8. In this case, split information indicating that each 16×16 coding unit is not to be split into a lower depth may be obtained from the bitstream. However, according to the features of the video, when a coding unit need not be split into a lowermost depth, e.g., when splitting of a coding unit into a lower depth is likely to be stopped at a middle depth between an uppermost depth and the lowermost depth, it may be efficient not to obtain split information for coding units which are equal to or less than a specific size from the bitstream. In an embodiment, the size limit information indicating a size of a coding unit for which split information is not to be obtained may be obtained from the bitstream and thus the bitstream may be efficiently used.

In an embodiment, referring to FIG. 5B, the video decoding apparatus 10 may split the coding unit 51a of the uppermost depth (the depth n) into coding units 51b or 51c of a lower depth (the depth n+1 or the depth n+2). To split coding units into coding units of a lower depth, a conventional method of obtaining split information for each of the coding units or the various embodiments described above to determine a coding unit of a lower depth may be used. In an embodiment, when the size limit information obtained from the bitstream by the video decoding apparatus 10 indicates that split information is not to be obtained for coding units having sizes which are equal to or less than that of coding unit of the lower depth (the depth n+2), the decoder 13 of the video decoding apparatus 10 may split the coding unit 51a of the uppermost depth (the depth n) into the coding units 51c of the lower depth (the depth n+2), and determine the coding units 51c of the lower depth (the depth n+2) to be current coding units without obtaining split information for the coding units 51c of the lower depth (the depth n+2) from the bitstream to determine whether the coding units 51c are to be split into coding units of the lower depth (the depth n+3), thereby determining prediction units or transformation units for the coding units 51c of the lower depth (the depth n+2).

In an embodiment, information indicated by the size limit information obtained from the bitstream by the video decoding apparatus 10 may be obtained in units of specific data units. In an embodiment, the video decoding apparatus 10 may obtain the size limit information from the bitstream in units of pictures, slices, slice segments, tiles, processing blocks, or largest coding units.

In an embodiment, in operation S515, when a size of at least one coding unit is greater than the size indicated by the size limit information, the video decoding apparatus 10 may obtain split information for at least one coding unit of a current depth from the bitstream. The decoder 13 of the video decoding apparatus 10 may determine whether the at least one coding unit of the current depth to coding units of a lower depth on the basis of the obtained split information.

In an embodiment, in operation S516, when the size of the at least one coding unit is equal to or less than the size indicated by the size limit information, the video decoding apparatus 10 may decode the at least one coding unit of the current depth. When the size of the at least one coding unit of the current depth is determined to be equal to or less than the size indicated by the size limit information, split information indicating whether a coding unit is to be split into a lower depth need not be obtained in relation to the at least one coding unit of the current depth from the bitstream. Thus, the at least one coding unit of the current depth may not be split and a decoding process may be performed.

In an embodiment, the video decoding apparatus 10 may compare the size indicated by the size limit information obtained from the bitstream with that of a coding unit of the current depth, and determine whether split information is to be obtained from the bitstream. Furthermore, in an embodiment, the size limit information obtained from the bitstream may directly indicate a specific size, and may indicate whether a size of the coding unit of the current depth is to be compared with a predetermined size to determine whether split information is to be obtained from the bitstream. That is, when the size limit information is information directly indicating the specific size, the amount of information to be transmitted in the bitstream may be increased. Thus, the specific size which is greater than a minimum size of the coding unit may be determined beforehand, and the size limit information indicating whether the size of the coding unit of the current depth is to be compared with the specific size may be obtained from the bitstream. When the size indicated by the size limit information is large and thus a large amount of data is required to transmit the size limit information, the video decoding apparatus 10 may use size limit information indicating only whether the size of the coding unit of the current depth is to be compared with the specific size, thereby relatively reducing the amount of data.

Figure 6A:
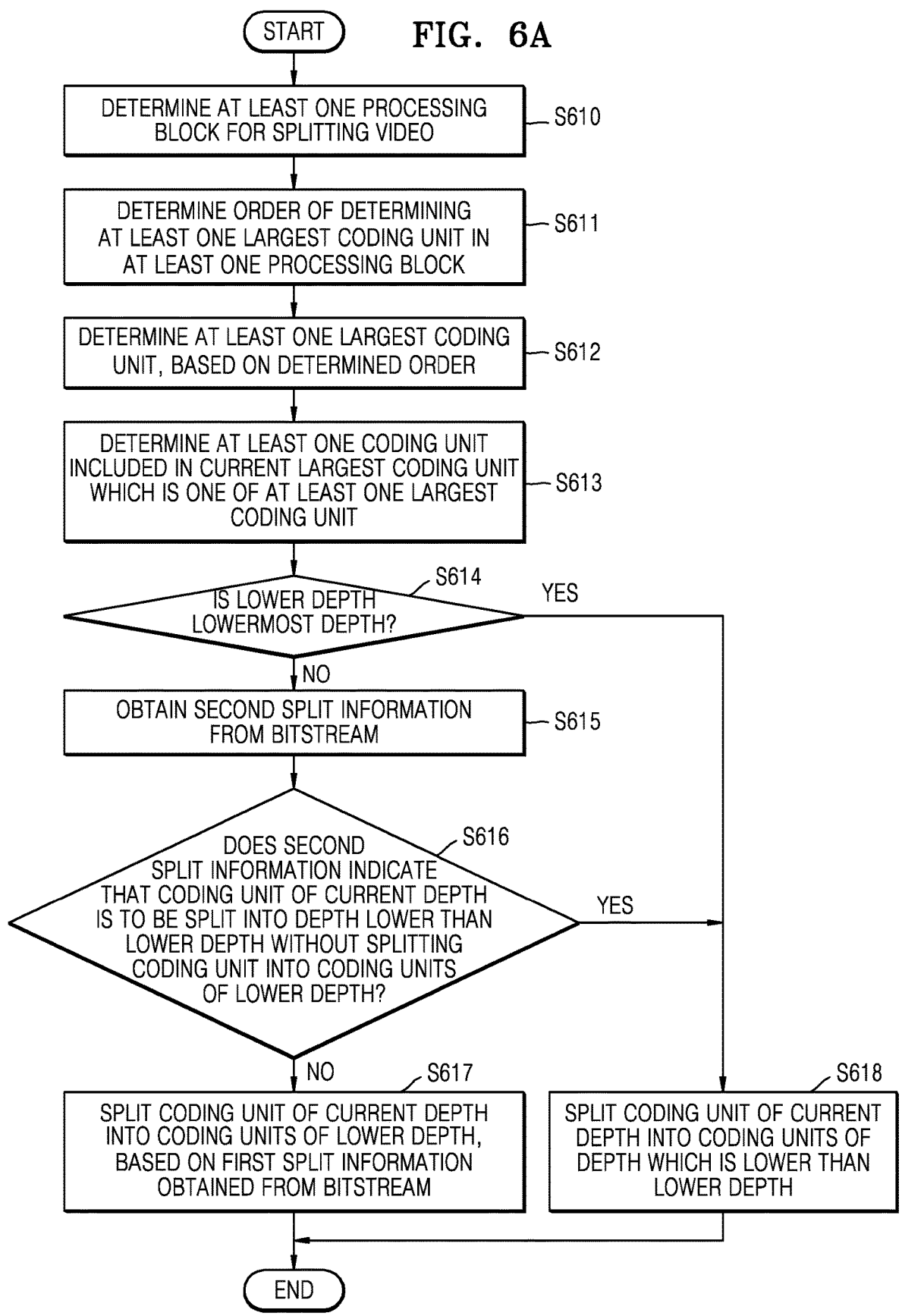
FIG. 6A is a flowchart of a process of determining a coding unit on the basis of second split information indicating whether the coding unit is to be split to a depth lower than a specific depth while skipping the specific depth, according to an embodiment.

FIG. 6A is a flowchart of a process of determining a coding unit on the basis of second split information indicating whether the coding unit is to be split to a depth lower than a specific depth while skipping the specific depth, performed by the video decoding apparatus 10, according to an embodiment.

In an embodiment, the video decoding apparatus 10 may determine whether a coding unit of a current depth is to be split into a depth lower than a specific depth while skipping the specific depth, rather than sequentially splitting the coding unit of the current depth into coding units of lower depths in a depth order.

In an embodiment, operations S610 to S612 performed by the video decoding apparatus 10 may correspond to operations S210 to S212 described above with reference to FIG. 1B and are not thus described in detail here.

In an embodiment, in operation S613, the decoder 13 of the video decoding apparatus 10 may determine a coding unit of a current depth which is included in a largest coding unit. The determined coding unit of the current depth may be split into coding units of lower depths by performing the following operations.

In an embodiment, in operation S614, the decoder 13 of the video decoding apparatus 10 may determine whether the lower depth in operation S613 is a lowermost depth. That is, in an embodiment, the decoder 13 of the video decoding apparatus 10 may determine whether second split information indicating whether a coding unit will be split to a depth lower than a lower depth while skipping the lower depth is to be obtained from a bitstream, according to whether the lower depth which is lower by one level than the current depth of the determined coding unit is a lowermost depth.

In operation S615, the video decoding apparatus 10 may obtain the second split information from the bitstream when the lower depth is not the lowermost depth, based on a result of determining whether the lower depth is the lowermost depth in operation S614.

In operation S616, the decoder 13 of the video decoding apparatus 10 may determine whether the second split information indicates whether the coding unit of the current depth is to be split to a depth lower than the lower depth without splitting this coding unit into coding units of the lower depth. In an embodiment, the decoder 13 of the video decoding apparatus 10 may split the coding unit of the current depth on the basis of split information including at least one of first split information and the second split information.

In an embodiment, in operation S617, the decoder 13 of the video decoding apparatus 10 may split the coding unit of the current depth into coding units of a lower depth on the basis of the first split information obtained from the bitstream, when the second split information does not indicate that the coding unit of the current depth is to be split to a depth lower than the lower depth without splitting this coding unit into coding units of the lower depth. The lower depth may be a depth which is lower by one level than the current depth. A process of determining coding unis of the lower depth which are included in the coding unit of the current depth on the basis of the first split information indicating whether a coding unit is to be split into the lower depth may be performed in various ways in the corresponding technical field, including a method of recursively splitting a coding unit which will be described below.

In an embodiment, in operation S618, the decoder 13 of the video decoding apparatus 10 may split the coding unit of the current depth into coding units of a depth which is lower than the lower depth but is not a lowermost depth, when the second split information indicates that the coding unit of the current depth is to be split to a depth lower than the lower depth without splitting the coding unit into coding units of the lower depth.

Figure 6B:
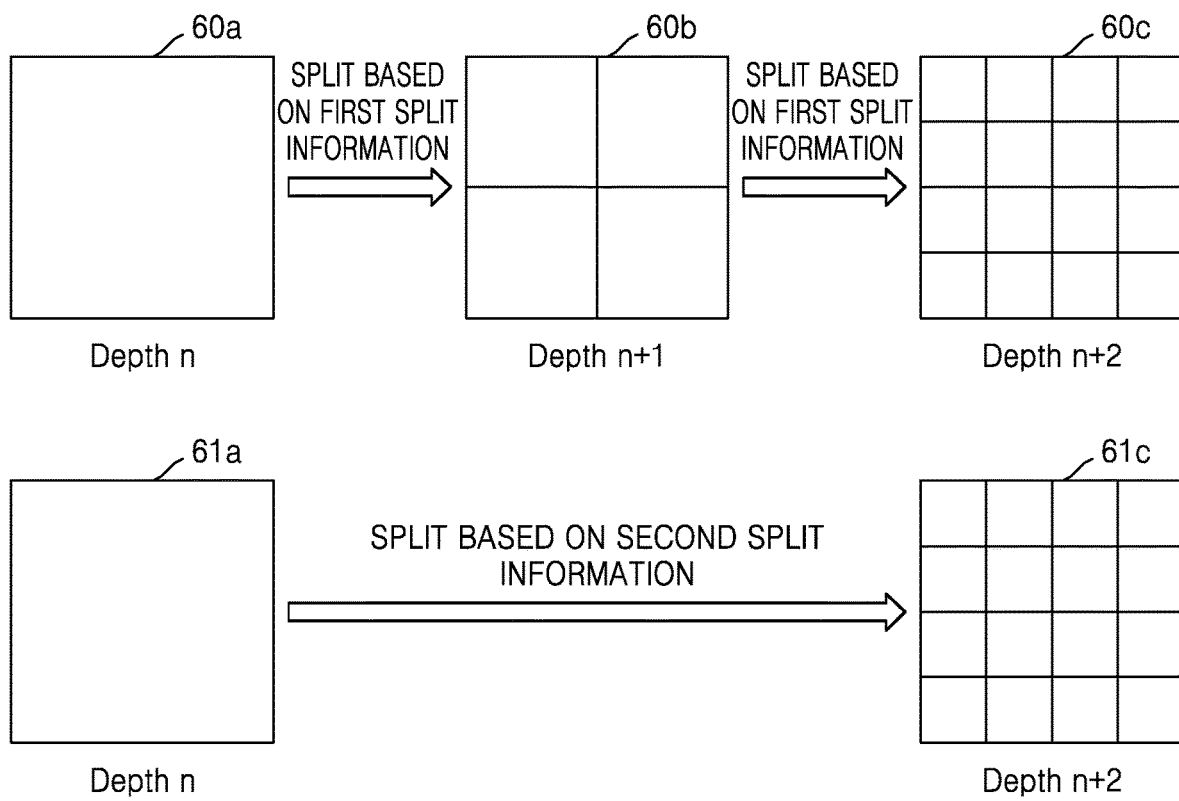
FIG. 6B illustrates a process of splitting a coding unit of a current depth on the basis of at least one of first split information and second split information, according to an embodiment.

FIG. 6B illustrates a process of splitting a coding unit of a current depth on the basis of at least one of first split information and second split information, performed by the video decoding apparatus 10, according to an embodiment.

In an embodiment, the decoder 13 of the video decoding apparatus 10 may split a coding unit 60a of a current depth (e.g., a depth n) into coding units 60b or 60c of a lower depth (e.g., a depth n+1 or a depth n+2) on the basis of the first split information. That is, according to the first split information, the coding unit 60a of the current depth (the depth n) may be split into the coding units 60b of the lower depth (e.g., the depth n+1) which is lower by one level than the current depth (the depth n) in a depth order. Furthermore, the decoder 13 of the video decoding apparatus 10 may split each of the coding units 60b into the coding units 60c of a depth (the depth n+2, a depth n+3, . . . ) which is lower than the lower depth (depth n+1) on the basis of first split information obtained for each of the coding units 60b of the lower depth (the depth n+1). However, when a coding unit is determined only using the first split information, all first split information for each of coding units to recursively split the coding unit should be obtained from the bitstream. Thus, it may be inefficient to obtain split information for all coding units of a middle depth (e.g., the depth n+1 between the depth n and the depth n+2) from the bitstream so as to determine whether the coding units of the middle depth are to be split.

In an embodiment, the decoder 13 of the video decoding apparatus 10 may use second split information indicating whether a coding unit is to be split into a depth lower than a specific depth while skipping the specific depth by obtaining the second split information from the bitstream, thereby skipping obtaining the first split information indicating whether a coding unit is to be split into coding units of the specific depth. Referring to FIG. 6B, the decoder 13 of the video decoding apparatus 10 may use the second split information to split the coding unit 61a of the current depth (the depth n). The second split information for the coding unit 61a may represent that the coding unit 61a is directly split into the coding units 61c of a depth (the depth n+2, the depth n+3, . . . ) which is lower than a lower depth (the depth n+1) while skipping a specific depth (e.g., the lower depth (the depth n+1) which is lower by one level than the current depth (depth n). Thus, the decoder 13 uses the second split information for the coding unit 61a and may thus not obtain first split information for coding units of a lower depth (the depth n+1) from the bitstream, thereby reducing the amount of information to be transmitted.

In an embodiment, the decoder 13 of the video decoding apparatus 10 may directly split a coding unit of a current depth (the depth n) into coding units of a depth (the depth n+2, the depth n+3, . . . ) which is lower than the lower depth (depth n+1) on the basis of the second split information. Furthermore, the decoder 13 may decode each of the coding units of the depth (the depth n+2, the depth n+3, . . . ) which are directly split from the coding unit of the current depth according to the second split information without obtaining first split information therefor from the bitstream.

Figure 7A:
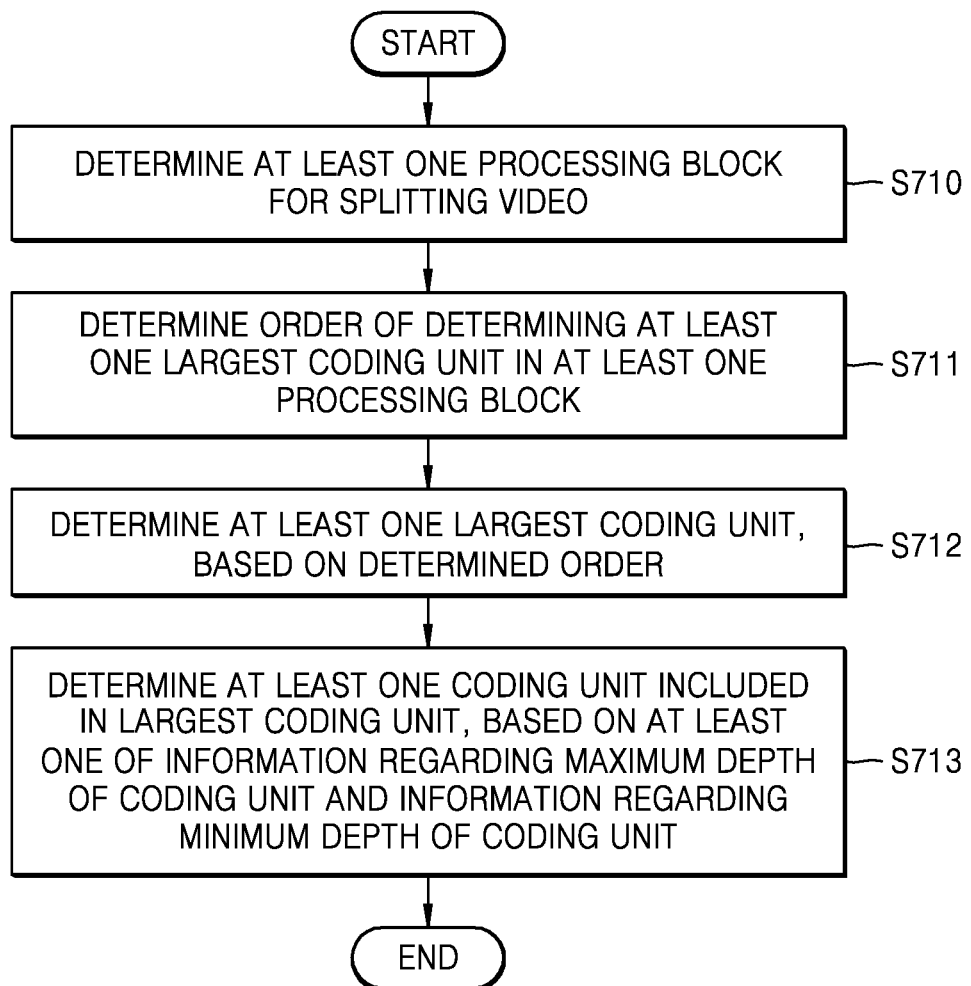
FIG. 7A is a flowchart of a process of determining at least one coding unit included in a largest coding unit on the basis of at least one of information regarding a maximum depth of a coding unit and information regarding a minimum depth of the coding unit, according to an embodiment.

FIG. 7A is a flowchart of a process of determining at least one coding unit included in a largest coding unit on the basis of at least one of information regarding a maximum depth of a coding unit and information regarding a minimum depth of the coding unit, performed by the video decoding apparatus 10, according to an embodiment.

In an embodiment, operations S710 to S712 performed by the video decoding apparatus 10 may correspond to the operations described above with reference to FIG. 1B and are thus not described in detail here.

In operation S713, the video decoding apparatus 10 may determine at least one coding unit included in a largest coding unit on the basis of at least one of information regarding a maximum depth of a coding unit and information regarding a minimum depth of the coding unit.

In an embodiment, the decoder 13 of the video decoding apparatus 10 may determine a maximum depth and a minimum depth to be used to perform recursive splitting in the largest coding unit on the basis of obtained information. For example, the decoder 13 may determine at least one coding unit included in the largest coding unit by performing recursive splitting starting from a coding unit of a depth indicated by the information regarding the maximum depth. According to the related art, at least one coding unit included in a largest coding unit is determined by performing recursive splitting in a depth order, starting from the largest coding unit. However, whether the largest coding unit is to be split should be first determined and thus the related art may be inefficient according to features of a video (e.g., when the video has a large number of high-frequency components and thus the number of regions which are not to be encoded or decoded due to large coding units such as a largest coding unit is large). In contrast, in an embodiment, the video decoding apparatus 10 obtains the information regarding the maximum depth from neighboring blocks and uses this information. Thus, recursive splitting may be performed starting from a coding unit of the depth indicated by the information regarding the maximum depth, rather than performing recursive splitting starting from a coding unit having the same size as a largest coding unit.

As another example, the decoder 13 may perform recursive splitting from a coding unit having the same size as a largest coding unit to a coding unit of a depth indicated by the information regarding the minimum depth. In the related art, at least one coding unit included in a largest coding unit is determined by recursively splitting coding units until split information for a coding unit of a current depth indicates that the coding unit is not to be split to a lower depth. However, since split information for all coding units should be obtained from a bitstream to determine whether they are to be split, the related art may be inefficient according to features of a video (e.g., when the video has a large number of low-frequency components and thus the number of regions which are not to be encoded or decoded due to small-sized coding units is large). In contrast, in an embodiment, the video decoding apparatus 10 obtains the information regarding the minimum depth from neighboring blocks and uses this information. Thus, recursive splitting may be performed to a coding unit of a depth indicated by the information regarding the minimum depth without causing recursive splitting to be stopped whenever split information for each coding unit is obtained. In an embodiment, split information for a coding unit of a depth indicated by the information regarding the minimum depth may not be obtained from a bitstream.

In an embodiment, the video decoding apparatus 10 may obtain at least one of the information regarding the maximum depth and the information regarding the minimum depth either from neighboring blocks or from a bitstream in units of specific data units. For example, the video decoding apparatus 10 may obtain at least one of the information regarding the maximum depth and the information regarding the minimum depth from the bitstream in units of sequences, pictures, slices, slice segments, tiles, processing blocks, largest coding units, or coding units. The video decoding apparatus 10 may determine at least one coding unit included in specific data units on the basis of at least one of the information regarding the maximum depth and the information regarding the minimum depth obtained from the bitstream in units of the specific data units.

Figure 7B:
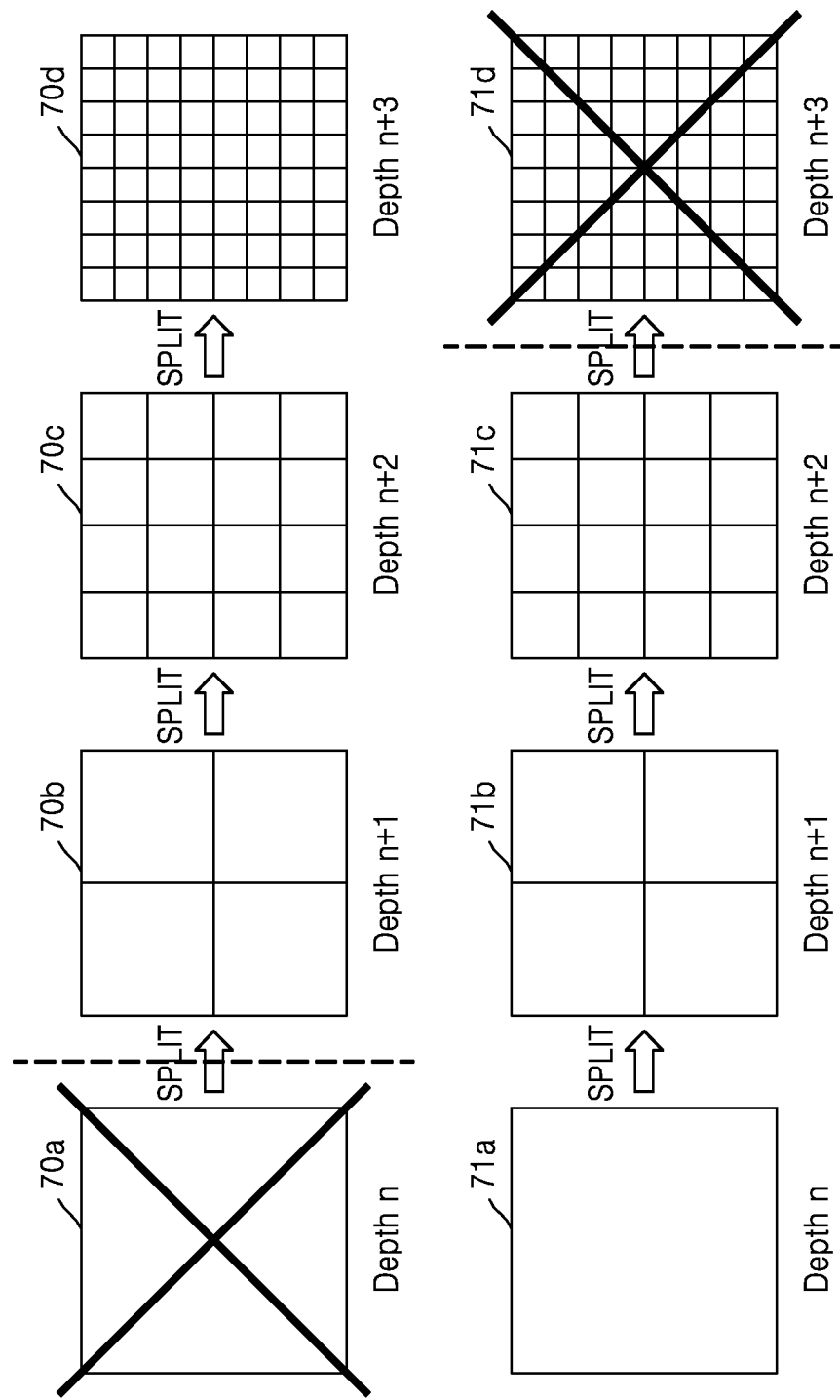
FIG. 7B illustrates a process of determining at least one coding unit on the basis of at least one of information regarding a maximum depth and information regarding a minimum depth, according to an embodiment.

FIG. 7B illustrates a process of determining at least one coding unit on the basis of at least one of information regarding a maximum depth and information regarding a minimum depth, performed by the video decoding apparatus 10, according to an embodiment.

In an embodiment, the decoder 13 of the video decoding apparatus 10 may determine a depth of a coding unit at which recursive splitting is started in a largest coding unit, based on information regarding a maximum depth. Referring to FIG. 7B, in an embodiment, when a depth indicated by the information regarding the maximum depth is a depth n+1, the decoder 13 may perform recursive splitting, starting from coding units 70b of a depth (a depth n+1) indicated by the information regarding the maximum depth. That is, the coding units 70b which are smaller than the largest coding unit may be recursively split into coding units 70c, 70d, . . . of lower depths (a depth n+2, a depth n+3, . . . ), rather than starting splitting by obtaining split information for a coding unit 70a having the same size as the largest coding unit. A depth at which the splitting of the coding units 70b is started may be the depth (the depth n+1) indicated by the information regarding the maximum depth.

In an embodiment, the decoder 13 of the video decoding apparatus 10 may determine a coding unit of a minimum depth at which recursive splitting is stopped in the largest coding unit on the basis of information regarding a minimum depth. Referring to FIG. 7B, in an embodiment, when a depth indicated by the information regarding the minimum depth is the depth n+2, the decoder 13 may perform recursive splitting to coding units 71c of the depth n+2 indicated by the information regarding the minimum depth. That is, recursive splitting may be performed from the coding unit 71a having the same size as the largest coding unit to coding units of the depth n+2 indicated by the information regarding the minimum depth. The coding units of the depth n+2 cannot be split into coding units of depths (the depth n+3) which are equal to or less than the depth n+2.

In an embodiment, the video decoding apparatus 10 may determine at least one coding unit included in a largest coding unit on the basis of the information regarding the maximum depth and the information regarding the minimum depth. For example, the decoder 13 of the video decoding apparatus 10 may recursively split a coding unit from the depth indicated by the information regarding the maximum depth to the depth indicated by the information regarding the minimum depth.

Figure 8A:
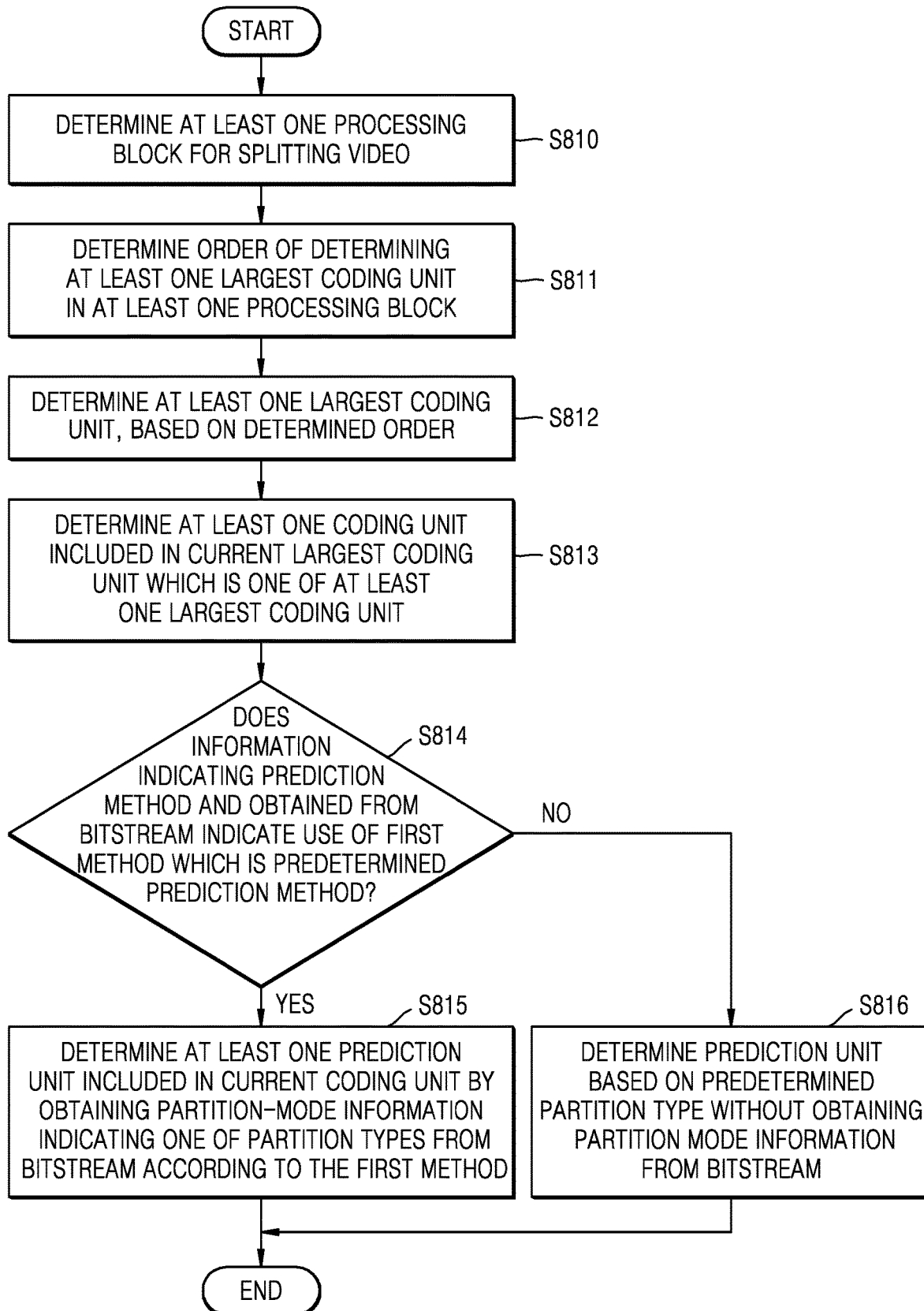
FIG. 8A is a flowchart of determining at least one prediction unit included in at least one coding unit by obtaining, from a bitstream, information indicating a prediction method, according to an embodiment.

FIG. 8A is a flowchart of determining at least one prediction unit included in at least one coding unit by obtaining information indicating a prediction method from a bitstream, performed by the video decoding apparatus 10, according to an embodiment.

Operations S810 to S812 performed by the video decoding apparatus 10 may correspond to operations S210 to S212 described above with reference to FIG. 1B and are thus not described in detail here.

In an embodiment, in operation S813, the video decoding apparatus 10 may determine at least one coding unit included in a current largest coding unit among at least one largest coding unit. The decoder 13 of the video decoding apparatus 10 may determine at least one coding unit included in the current largest coding unit according to the various embodiments described above or by performing recursive splitting starting from the largest coding unit according to the related art.

In an embodiment, in operation S814, the decoder 13 of the video decoding apparatus 10 may determine whether information indicating a prediction method indicates use of a first method which is a predetermined prediction method. The information indicating the prediction method may be obtained from the bitstream. The decoder 13 of the video decoding apparatus 10 may determine whether a prediction unit is to be determined using the predetermined prediction method or a method different from the predetermined prediction method on the basis of the information indicating the prediction method.

In operation S815, when the information indicating the prediction method indicates use of the first method which is the predetermined prediction method, the decoder 13 of the video decoding apparatus 10 may determine at least one prediction unit included in a current coding unit by obtaining partition-mode information indicating one of a plurality of partition types from the bitstream according to the first method.

In operation S816, when the information indicating the prediction method does not indicate use of the first method which is the predetermined prediction method, the decoder 13 of the video decoding apparatus 10 may determine a prediction unit included in the current coding unit according to a second method which is different from the first method which is the predetermined method. In an embodiment, according to the second method, the decoder 13 of the video decoding apparatus 10 may determine a prediction unit on the basis of a predetermined partition type without obtaining partition-mode information from the bitstream. In an embodiment, the partition-mode information may be information indicating one of a plurality of partition types. When a partition type is determined using the first method, the decoder 13 of the video decoding apparatus 10 may obtain the partition-mode information from the bitstream and determine a prediction unit according to the partition type indicated by the partition-mode information. However, as the number of partition types which may be indicated by the partition-mode information becomes large, the amount of bits needed for the partition-mode information may increase. Thus, in an embodiment, according to features of a video, the decoder 13 of the video decoding apparatus 10 may determine at least one prediction unit included in the current coding unit by using a partition type determined beforehand on the basis of the second method without obtaining the partition-mode information from the bitstream to select one of various partition modes.

Figure 8B:
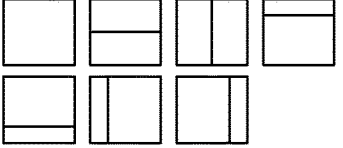
FIG. 8B illustrates a process of determining at least one prediction unit included in a current coding unit according to a first method or a second method on the basis of information regarding a prediction method, according to an embodiment.

FIG. 8B illustrates a process of determining at least one prediction unit included in a current coding unit according to a first method or a second method on the basis of information regarding a prediction method, performed by the decoder 13 of the video decoding apparatus 10, according to an embodiment.

In an embodiment, the decoder 13 of the video decoding apparatus 10 may determine at least one prediction unit by using a partition type indicated by partition-mode information by obtaining partition-mode information according to a first method which is a predetermined prediction method on the basis of information regarding a prediction method obtained from a bitstream. Referring to FIG. 8B, when a prediction unit is determined according to the first method, partition-mode information indicating one of various prediction-unit shapes for each of coding units may be used. The various prediction-unit shapes indicated by the partition-mode information will be described below. According to the first method, partition units for splitting at least one of horizontal and vertical sizes of the current coding unit into half or at a ratio of ¼ or ¾ may be determined or a prediction unit having the same size as a coding unit may be determined.

In an embodiment, the decoder 13 of the video decoding apparatus 10 may determine a prediction unit by using a predetermined partition type (e.g., a partition having the same size as the current coding unit) without obtaining the partition-mode information from the bitstream, according to the second method which is a predetermined prediction method and based on the information regarding the prediction method obtained from the bitstream. Referring to FIG. 8B, the decoder 13 of the video decoding apparatus 10 may determine a prediction unit having the same size as the current coding unit according to the second method. Thus, when the current coding unit need not be split into sub-prediction units according to features of a video, a prediction unit may be determined according to the predetermined partition type according to the second method without obtaining the partition-mode information.

In an embodiment, the decoder 13 of the video decoding apparatus 10 may determine a prediction unit for the current coding unit on the basis of the second method. When a size of the current coding unit is determined to be the same as that of a largest coding unit, a prediction unit having the same size as a coding unit of a lower depth of the current coding unit may be determined. Referring to FIG. 8B, in an embodiment, the decoder 13 of the video decoding apparatus 10 may determine a size of the current coding unit to be 64×64 which is the same as the largest coding unit. When the information regarding the prediction method indicates that a prediction unit is determined using the second method and when the current coding unit has a size of 64×64 to be the same as the largest coding unit, the decoder 13 may determine a prediction unit having a size of 32×32 which is the same as a coding unit of a lower depth of the current coding unit on the basis of the predetermined partition type.

Video encoding methods according to other embodiments will be described below. The video encoding methods to be described below may be implemented by performing operations reverse to those of a video decoding method within a range in which they can be easily implemented by technicians of ordinary skill in the technical field.

Figure 2A:
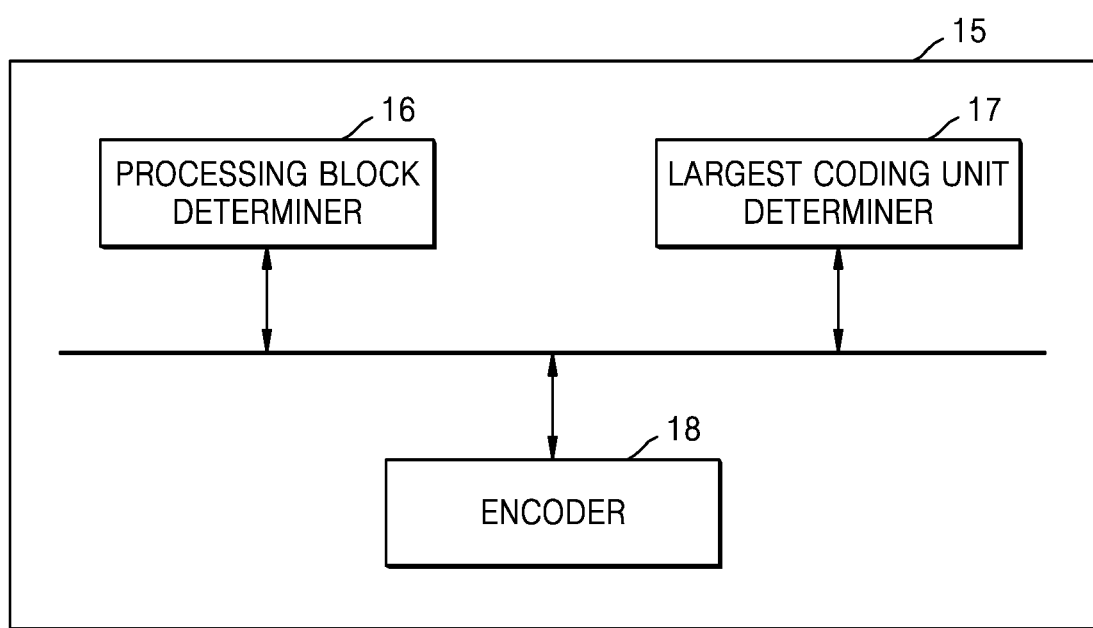
FIG. 2A is a block diagram of a video encoding apparatus according to an embodiment.

FIG. 2A is a block diagram of a video encoding apparatus 15 according to an embodiment. The video encoding apparatus 15 may include a processing block determiner 16, a largest coding unit determiner 17, and an encoder 18. In an embodiment, operations performed by the components of the video encoding apparatus 15 may be realized by separate hardware or software components or by one hardware component (e.g., a CPU). The operations performed by the components of the video encoding apparatus 15 will be described in detail in the following embodiments.

Figure 2B:
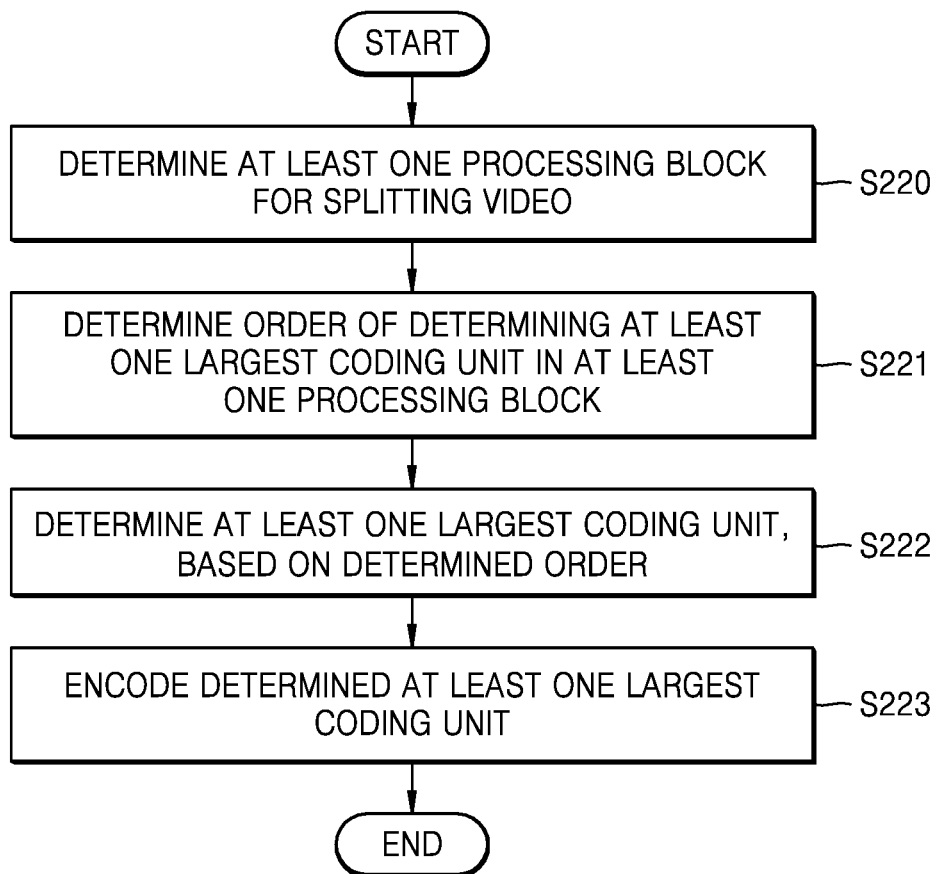
FIG. 2B is a flowchart of a video encoding method performed using a processing block by a video encoding apparatus, according to an embodiment.

FIG. 2B is a flowchart of a video encoding method performed using a processing block by the video encoding apparatus 15, according to an embodiment.

In operation S220, the video encoding apparatus 15 may determine at least one processing block for splitting a video.

In an embodiment, the processing block determiner 16 of the video encoding apparatus 15 may determine at least one processing block for splitting a video into frames. The at least one processing block is a data unit including at least one largest coding unit for splitting a video. At least one largest coding unit included in the at least one processing block may be determined in a specific order. That is, an order of determining at least one largest coding unit in each processing block may be one of various orders of determining a largest coding unit. The order of determining at least one largest coding unit may be different for each processing block.

In an embodiment, the video encoding apparatus 15 may generate a bitstream including information regarding a size of the at least one processing block. A decoding side receiving the information regarding the size of the at least one processing block from the bitstream may determine the size of the at least one processing block included in a video. The size of the at least one processing block may be a specific size of a data unit indicated by information regarding the size of the at least one processing block.

FIG. 3 illustrates an order of determining at least one largest coding unit in at least one processing block included in a picture 30, performed by the video encoding apparatus 15, according to an embodiment. In FIG. 3, the determining of the at least one largest coding unit by the video encoding apparatus 15 has been described above in relation to the operations performed by the video decoding apparatus 10 and is thus not described in detail here.

In an embodiment, in operation S222, the video encoding apparatus 15 may determine at least one largest coding unit in a determined order.

In an embodiment, the largest coding unit determiner 17 of the video encoding apparatus 15 may obtain information regarding an order of determining a largest coding unit as information related to processing blocks 31 and 33 from a bitstream, determine an order of determining at least one largest coding unit included in the processing blocks 31 and 33, and determine at least one largest coding unit included in the picture 30.

In an embodiment, in operation S223, the video encoding apparatus 15 may encode the determined at least one largest coding unit. The encoder 18 of the video encoding apparatus 15 may encode a video according to the at least one largest coding unit determined in operation S222. A method of encoding the at least one largest coding unit may include various ways of encoding a video.

FIG. 4A is a flowchart of a process of determining at least one coding unit included in a largest coding unit, performed by the video encoding apparatus 15, according to an embodiment.

In an embodiment, operations S410 to S412 performed by the video encoding apparatus 15 may correspond to operations S220 to S222 described above with reference to FIG. 2B and are thus not described in detail here.

In an embodiment, in operation S413, the video encoding apparatus 15 may select one of a plurality of sizes which are equal to or less than that of a determined largest coding unit as a size of a coding unit on the basis of coding-unit size information obtained from a bitstream.

FIG. 4B illustrates a process of determining a size of at least one coding unit included in a picture 40, performed by the video encoding apparatus 15, according to an embodiment.

The encoder 18 of the video encoding apparatus 15 may determine at least one coding unit included in a largest coding unit on the basis of coding-unit size information obtained from a bitstream. The video encoding apparatus 15 may generate the bitstream including the coding-unit size information. A decoding side may obtain the bitstream and split each largest coding unit into at least one coding unit. Sizes of such coding units may be independently determined for each largest coding unit. In an embodiment, a bitstream including coding-unit size information may be generated for each specific data unit (e.g., a picture, a processing block, a slice, a slice segment, or a largest coding unit). For convenience of explanation, it will be hereinafter assumed that the video encoding apparatus 15 generates a bitstream including coding-unit size information for each largest coding unit.

FIG. 4C illustrates coding-unit sizes which may be indicated by coding-unit size information by the video encoding apparatus 15, according to an embodiment.

In an embodiment, when the video encoding apparatus 15 uses coding-unit size information, a process of determining a coding unit by performing recursive splitting starting from the largest coding unit on the basis of split information is not needed, and a largest coding unit may be directly split into coding units each having a size indicated by the coding-unit size information. Thus, the size indicated by the coding-unit size information may include a size of the largest coding unit corresponding to an uppermost depth and sizes of coding units into which the largest coding unit is sequentially split into a lower depth to a lowermost depth. At least one among sizes between the size corresponding to the uppermost depth and a size corresponding to the lowermost depth may be skipped.

FIG. 5A is a flowchart of generating a bitstream including size limit information of coding units and determining whether a bitstream including split information for coding units is to be generated on the basis of the size limit information, performed by the video encoding apparatus 15, according to an embodiment.

In an embodiment, operations S510 to S512 performed by the video encoding apparatus 15 may correspond to the operations described above with reference to FIG. 2B and are thus not described in detail here.

In an embodiment, in operation S513, the video encoding apparatus 15 may determine at least one coding unit included in a current largest coding unit which is one of largest coding units determined in S512. In an embodiment, the determining of the at least one coding unit included in the current largest coding unit may be performed by operations S413 to S414 of FIG. 4A which are performed by the encoder 18 of the video encoding apparatus 15 or performed in various other ways in the technical field. In an embodiment, an encoding process performed by the encoder 18 may include a video encoding method which will be described below.

In an embodiment, in operation S514, the video encoding apparatus 15 may generate a bitstream including size limit information for coding units, and compare a size of the at least one coding unit with a size indicated by the size limit information on the basis of the size limit information. In an embodiment, the size limit information may include information for determining whether a coding unit is to be split into a lower depth. For example, when a size of a current coding unit is compared with the size indicated by the size limit information, whether the current coding unit is to be split into a lower depth may be determined on the basis of a result of the comparison.

In an embodiment, information indicated by the size limit information may be information for determining whether a coding unit is to be split to a lower depth and may represent a size greater than a minimum size of the coding unit.

In an embodiment, in operation S515, when a size of at least one coding unit is greater than the size indicated by the size limit information, the video encoding apparatus 15 may generate a bitstream including split information for at least one coding unit of a current depth. The encoder 18 of the video encoding apparatus 15 may determine whether the at least one coding unit of the current depth is to be split into a lower depth on the basis of the split information.

In an embodiment, in operation S516, when a size of the at least one coding unit is equal to or less than the size indicated by the size limit information, the video encoding apparatus 15 may encode the at least one coding unit of the current depth. When it is determined that the size of the at least one coding unit of the current depth is equal to or less than the size indicated by the size limit information, split information indicating the at least one coding unit of the current depth is to be split into a lower depth need not be encoded. Accordingly, splitting may be stopped at the at least one coding unit of the current depth and then an encoding process may be performed.

FIG. 6A is a flowchart of a process of determining a coding unit on the basis of second split information indicating whether the coding unit is to be split to a depth lower than a specific depth while skipping the specific depth, performed by the video encoding apparatus 15, according to an embodiment.

In an embodiment, the video encoding apparatus 15 may determine whether a coding unit of a current depth is to be split into a lower depth while skipping a specific depth, rather than sequentially splitting the coding unit into coding units of lower depths in a depth order.

In an embodiment, operations S610 to S612 performed by the video encoding apparatus 15 may correspond to operations S220 to S222 described above with reference to FIG. 2B and are not thus described in detail here.

In an embodiment, in operation S613, the encoder 18 of the video encoding apparatus 15 may determine a coding unit of a current depth included in a largest coding unit. The determined coding unit of the current depth may be split into coding units of a lower depth by performing the following operations.

In an embodiment, in operation S614, the encoder 18 of the video encoding apparatus 15 may determine whether the lower depth in operation S613 is a lowermost depth. That is, in an embodiment, the encoder 18 of the video encoding apparatus 15 may determine whether second split information indicating that the coding unit is to be split into a depth lower than the lower depth while skipping splitting the coding unit into the lower depth is to be encoded, based on whether the lower depth which is lower by one level than the current depth of the determined coding unit is the lowermost depth.

In operation S615, the video encoding apparatus 15 may obtain the second split information from the bitstream when it is determined that the lower depth is not the lowermost depth on the basis of a result of the determination in operation S614.

In operation S616, the encoder 18 of the video encoding apparatus 15 may determine whether the second split information indicates that the coding unit of the current depth is to be split into a depth lower than the lower depth without splitting the coding unit into the lower depth. In an embodiment, the encoder 18 of the video encoding apparatus 15 may split the coding unit of the current depth on the basis of split information including at least one of first split information and the second split information.

In an embodiment, in operation S617, when the second split information does not indicate that the coding unit of the current depth is to be split into a depth lower than the lower depth without splitting the coding unit into the lower depth, the encoder 18 of the video encoding apparatus 15 may split the coding unit of the current depth into coding units of a lower depth on the basis of the first split information.

In an embodiment, in operation S618, when the second split information indicates that the coding unit of the current depth is to be split into a depth lower than the lower depth without splitting the coding unit into the lower depth, the encoder 18 of the video encoding apparatus 15 may split the coding unit of the current depth into coding units of a depth which is lower than the lower depth and is not a lowermost depth.

FIG. 6B illustrates a process of splitting a coding unit of a current depth on the basis of at least one of first split information and second split information, performed by the video encoding apparatus 15, according to an embodiment. The process of splitting the coding unit by the video encoding apparatus 15 may correspond to the operation performed by the video decoding apparatus 10 described above with reference to FIG. 6B and is not thus described in detail here.

FIG. 7A is a flowchart of a process of determining at least one coding unit included in a largest coding unit on the basis of at least one of information regarding a maximum depth of a coding unit and information regarding a minimum depth of the coding unit, performed by the video encoding apparatus 15, according to an embodiment. FIG. 7B illustrates a process of determining at least one coding unit on the basis of at least one of information regarding a maximum depth and information regarding a minimum depth, performed by the video encoding apparatus 15, according to an embodiment.

The process of determining at least one coding unit illustrated in FIGS. 7A and 7B, performed by the video encoding apparatus 15, may correspond to the operation performed by the video decoding apparatus 10 described above with reference to FIGS. 7A and 7B and is not thus described in detail here.

FIG. 8A is a flowchart of determining at least one prediction unit included in at least one coding unit by obtaining information indicating a prediction method from a bitstream, performed by the video encoding apparatus 15, according to an embodiment.

FIG. 8B illustrates a process of determining at least one prediction unit included in a current coding unit according to a first method or a second method on the basis of information regarding a prediction method, performed by the encoder 18 of the video encoding apparatus 15, according to an embodiment.

In FIGS. 8A and 8B, the process of determining at least one prediction unit by the video encoding apparatus 15 may correspond to the operation performed by the video decoding apparatus 10 described above with reference to FIGS. 8A and 8B and is thus not described in detail here.

Figure 9:
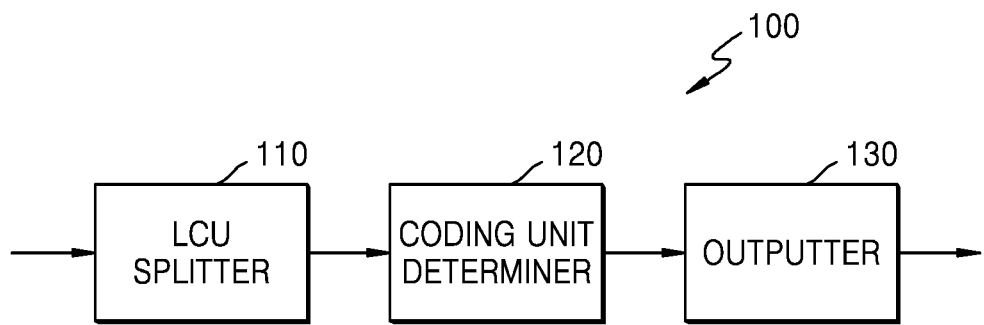
FIG. 9 is a block diagram of a video encoding apparatus based on coding units of a tree structure, according to an embodiment.

FIG. 9 illustrates a block diagram of a video encoding apparatus based on coding units of a tree structure 100, according to an embodiment.

In FIG. 9, a video encoding apparatus 100 may correspond to the video encoding apparatus 15 of FIG. 2A.

The video encoding apparatus involving video prediction based on coding units of the tree structure 100 includes a coding unit determiner 120 and an output unit 130. Hereinafter, for convenience of description, the video encoding apparatus 100 involving video prediction based on coding units of the tree structure is referred to as the 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in powers of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. That is, the coding unit determiner 120 determines a final depth by encoding the image data in the deeper coding units according to depths, according to the largest coding unit of the current picture, and selecting a depth having the minimum encoding error. The determined final depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the minimum encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 120 according to the embodiment may determine coding units having a tree structure included in the current largest coding unit. The 'coding units having a tree structure' according to an embodiment include coding units corresponding to a depth determined to be the final depth, from among all deeper coding units included in the current largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. In this regard, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 100 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit corresponding to a final depth according to an embodiment, i.e., based on a coding unit that is no longer split to coding units corresponding to a lower depth. A partition obtained by splitting a coding unit may include a coding unit and a data unit obtained by splitting at least one of a height and a width of the coding unit. A partition may include a data unit where a coding unit is split, and a data unit having the same size as the coding unit. A partition that is a base of prediction may be referred to as a 'prediction unit'.

For example, when a coding unit of 2N×2N (where N is a positive integer) is no longer split, it becomes a prediction unit of 2N×2N, and a size of a partition may be 2N×2N, 2N×N, N×2N, or N×N. Examples of a partition mode may include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, partitions having arbitrary shapes, or the like.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 100 according to the embodiment may also perform the transformation on the image data in a coding unit based on not only the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 120 may determine not only a depth generating a minimum encoding error but may also determine a partition mode in which a prediction unit is split to partitions, a prediction mode according to prediction units, and a size of a transformation unit for transformation.

Coding units according to a tree structure in a largest coding unit and methods of determining a prediction unit/ partition, and a transformation unit, according to embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one depth determined by the coding unit determiner 120, and split information according to depths.

The encoded image data may correspond to a result obtained by encoding residual data of an image.

The split information according to depths may include depth information, partition mode information of the prediction unit, prediction mode information, and the split information of the transformation unit.

Final-depth information may be defined by using split information according to depths, which specifies whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed on the coding units having the same depth.

Since the coding units having a tree structure are determined for one largest coding unit, and at least one piece of split information has to be determined for a coding unit of a depth, at least one piece of split information may be determined for one largest coding unit. Also, data of the largest coding unit may vary according to locations since the data is hierarchically split according to depths, and thus a depth and split information may be set for the data.

Accordingly, the output unit 130 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 130 may encode and output reference information, prediction information, and slice type information, which are related to prediction.

According to the simplest embodiment of the video encoding apparatus 100, the deeper coding unit may be a coding unit obtained by dividing a height and width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined in consideration of characteristics of the current picture. Also, since encoding may be performed on each largest coding unit by using any one of various prediction modes and transformations, an optimum encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, video compression efficiency may be increased since a coding unit is adjusted while considering characteristics of an image while increasing a maximum size of a coding unit while considering a size of the image.

Figure 10:
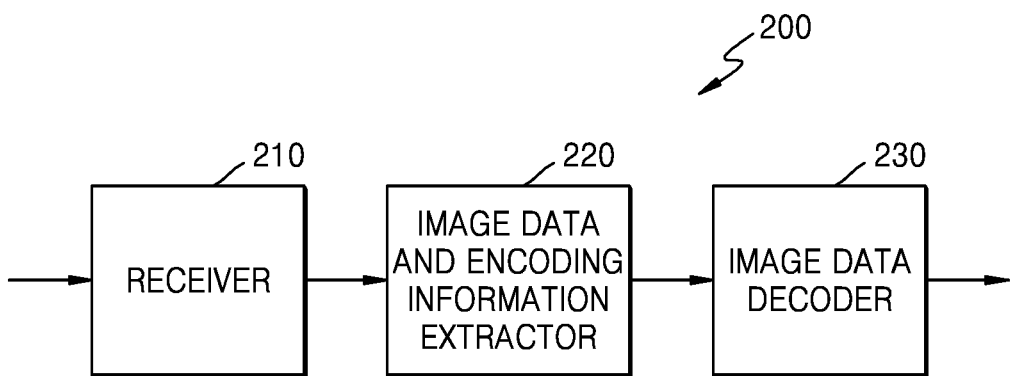
FIG. 10 is a block diagram of a video decoding apparatus based on coding units of a tree structure, according to an embodiment.

FIG. 10 is a block diagram of a video decoding apparatus based on coding units according to tree structure 200, according to various embodiments. A video decoding apparatus 200 of FIG. 10 may correspond to the video decoding apparatus 10 of FIG. 1A.

The video decoding apparatus involving video prediction based on coding units of the tree structure 200 according to the embodiment includes a receiver 210, an image data and encoding information extractor 220, and an image data decoder 230. The image data decoder 230 may correspond to the decoder 13 of FIG. 1A. Hereinafter, for convenience of description, the video decoding apparatus 200 involving video prediction based on coding units of the tree structure according to the embodiment is referred to as the 'video decoding apparatus 200'.

The definition of various terms, such as coding unit, depth, prediction unit, transformation unit, and various split information, related to a decoding operation performed by the video decoding apparatus 200 according to an embodiment are the same as that of the terms described above with respect to the video encoding apparatus 100 of FIG. 9.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts, from the parsed bitstream, a final depth and split information about the coding units having a tree structure according to each largest coding unit. The extracted final depth and the extracted split information are output to the image data decoder 230. That is, the image data in a bitstream is split into the largest coding unit so that the image data decoder 230 may decode the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 220 are a depth and split information determined to generate a minimum encoding error when an encoder, such as the video encoding apparatus 100, repeatedly performs encoding on each deeper coding unit according to depths according to each largest coding unit. Accordingly, the video decoding apparatus 200 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 220 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 230 reconstructs the current picture by decoding the image data in each largest coding unit based on the depth and the split information according to each of the largest coding units. That is, the image data decoder 230 may decode the encoded image data, based on a read partition mode, a prediction mode, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition mode and the prediction mode of the prediction unit of the coding unit according to depths.

In addition, for inverse transformation for each largest coding unit, the image data decoder 230 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

In order to reconstruct first layer images and second layer images by decoding a received first layer image stream and a received second layer image stream, video decoding apparatuses 200 corresponding to the number of viewpoints may be included.

When the first layer image stream is received, the image data decoder 230 of the video decoding apparatus 200 may split samples of the first layer images, which are extracted from the first layer image stream by an extractor 220, into coding units according to a tree structure of a largest coding unit. The image data decoder 230 may perform motion compensation, based on prediction units for the inter-image prediction, on each of the coding units according to the tree structure of the samples of the first layer images, and may reconstruct the first layer images.

When the second layer image stream is received, the image data decoder 230 of the video decoding apparatus 200 may split samples of the second layer images, which are extracted from the second layer image stream by the extractor 220, into coding units according to a tree structure of a largest coding unit. The image data decoder 230 may perform motion compensation, based on prediction units for the inter-image prediction, on each of the coding units of the samples of the second layer images, and may reconstruct the second layer images.

The extractor 220 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 11:
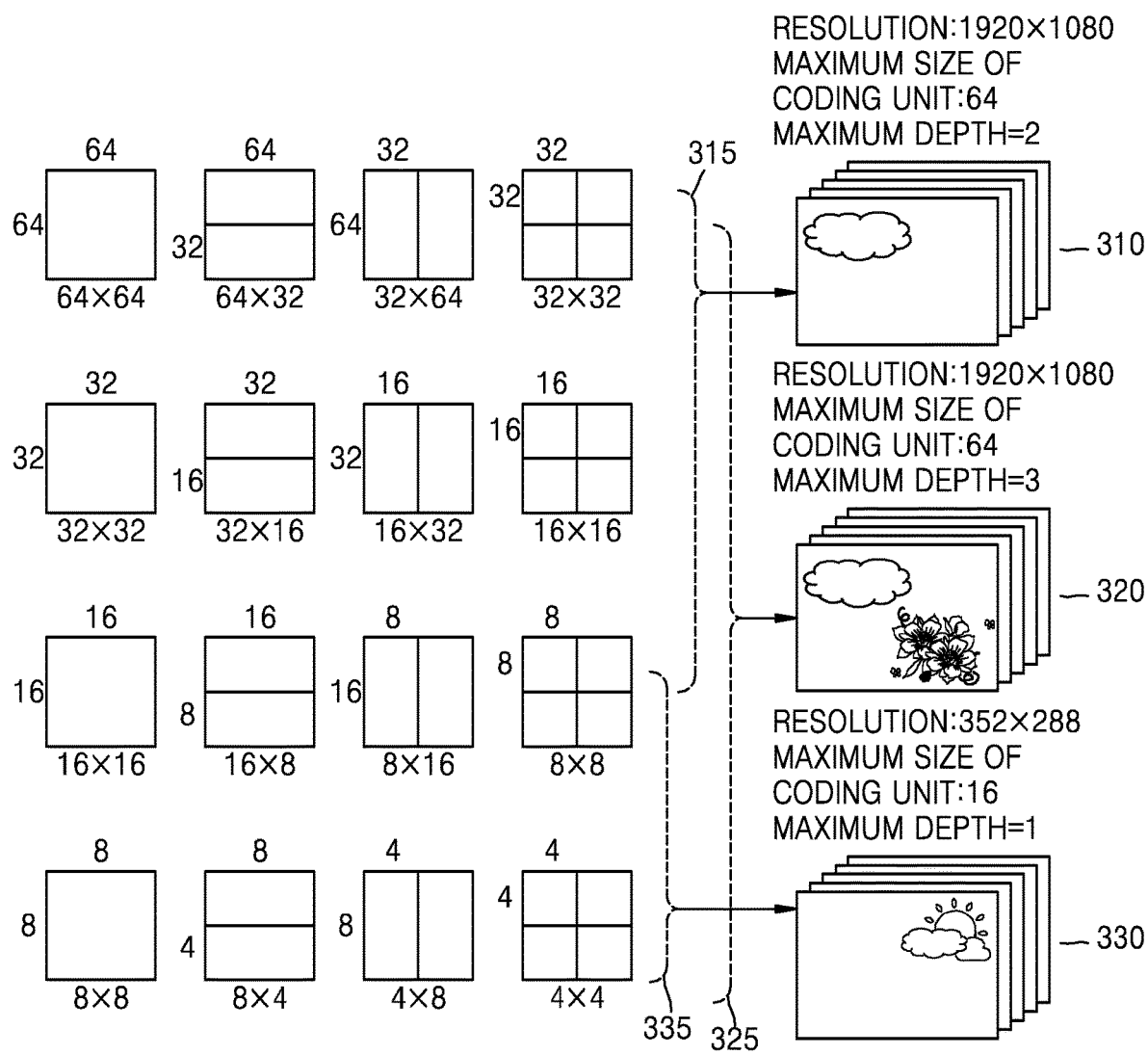
FIG. 11 illustrates a concept of coding units, according to an embodiment.

FIG. 11 illustrates a concept of coding units, according to various embodiments. In an embodiment, in FIG. 11, a process of splitting a coding unit according to a depth may be a process in which the video decoding apparatus 10 or the video encoding apparatus 15 splits the coding unit in a depth order on the basis of first split information which is split information to recursively split the coding unit. When second split information indicating a coding unit of a current depth (a depth n) is to be directly split into coding units of a depth (depth n+2, depth n+3 . . . ) lower than a lower depth (a depth n+1) rather than coding units of the lower depth (the depth n+1) is used, a coding unit may be determined differently from the process illustrated in FIG. 11.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 11 denotes a total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 310 and 320 having a higher resolution than the video data 330 may be selected to 64.

Since the maximum depth of the video data 310 is 2, coding units 315 of the video data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 12:
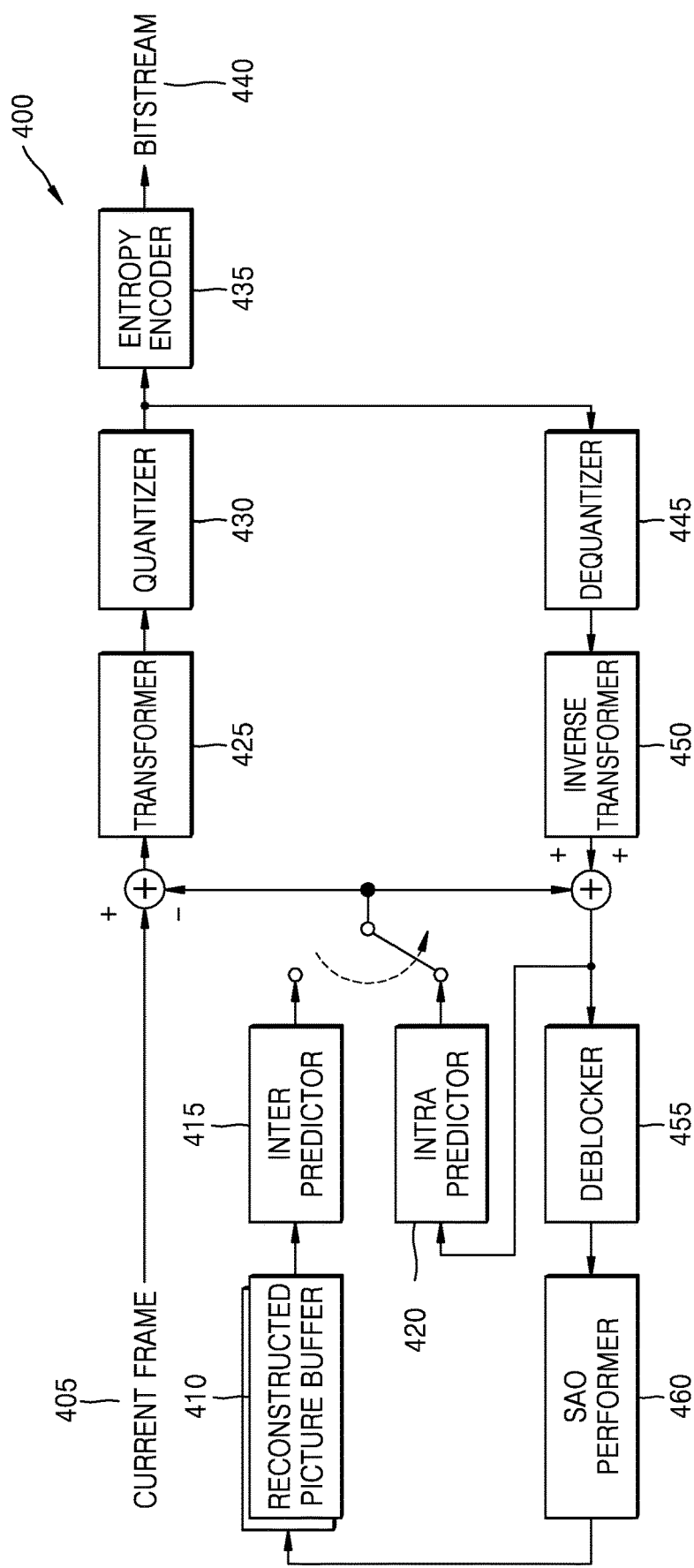
FIG. 12 illustrates a block diagram of an image encoder based on coding units, according to an embodiment.

FIG. 12 is a block diagram of an image encoder 400 based on coding units, according to various embodiments.

The image encoder 400 according to an embodiment performs operations of a picture encoder 120 of the video encoding apparatus 100 so as to encode image data. That is, an intra predictor 420 performs intra prediction on coding units in an intra mode, from among a current image 405, per prediction unit, and an inter predictor 415 performs inter prediction on coding units in an inter mode by using the current image 405 and a reference image obtained from a reconstructed picture buffer 410 according to prediction units. The current picture 405 may be split into largest coding units, and then the largest coding units may be sequentially encoded. In this regard, the largest coding unit that is to be split into coding units having a tree structure may be encoded.

Residual data is generated by subtracting prediction data of a coding unit of each mode output from the intra predictor 420 or the inter predictor 415 from data of the current image 405 to be encoded, and the residual data is output as a quantized transformation coefficient through a transformer 425 and a quantizer 430 per transformation unit. The quantized transformation coefficient is reconstructed as the residue data in a spatial domain through an inverse-quantizer 445 and an inverse-transformer 450. The reconstructed residue data in the spatial domain is added to the prediction data of the coding unit of each mode output from the intra predictor 420 or the inter predictor 415 to be reconstructed as data in a spatial domain of the coding unit of the current image 405. The reconstructed data in the spatial domain is generated as a reconstructed image through a deblocking unit 455 and an SAO performer 460. The reconstructed image is stored in the reconstructed picture buffer 410. The reconstructed images stored in the reconstructed picture buffer 410 may be used as reference images for inter predicting another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse-quantizer 445, the inverse-transformer 450, the deblocking unit 455, and the SAO performer 460, may perform operations based on each coding unit among coding units having a tree structure according to each largest coding unit.

In particular, the intra predictor 420 and the inter predictor 415 may determine a partition mode and a prediction mode of each coding unit from among the coding units having a tree structure, by taking into account the maximum size and the maximum depth of a current largest coding unit, and the transformer 425 may determine whether to split a transformation unit according to a quad tree in each coding unit from among the coding units having a tree structure.

Figure 13:
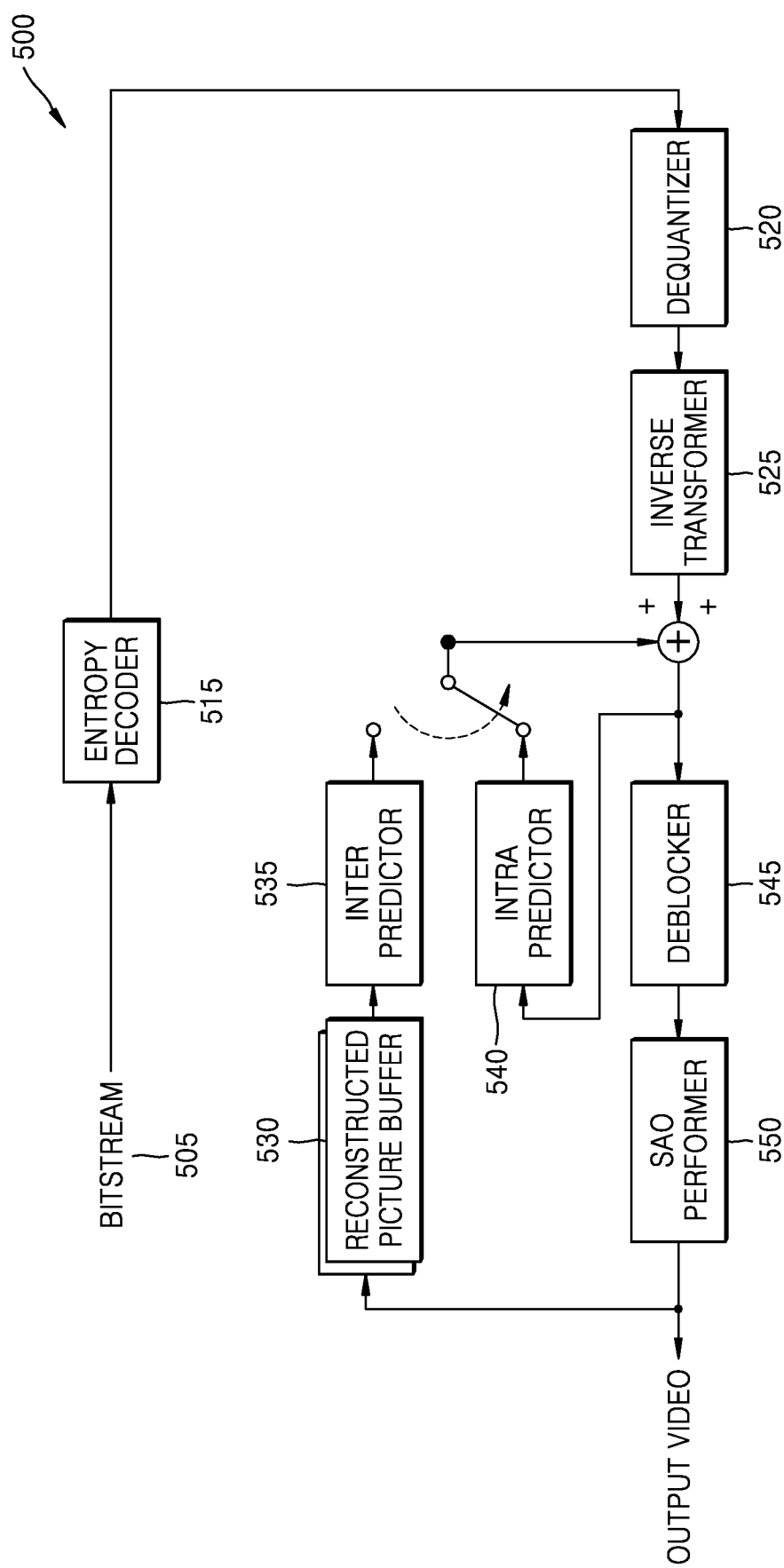
FIG. 13 illustrates a block diagram of an image decoder based on coding units, according to an embodiment.

FIG. 13 illustrates a block diagram of an image decoder 500 based on coding units, according to various embodiments.

An entropy decoder 515 parses, from a bitstream 505, encoded image data to be decoded and encoding information required for decoding. The encoded image data corresponds to a quantized transformation coefficient, and an inverse-quantizer 520 and an inverse-transformer 525 reconstruct residue data from the quantized transformation coefficient.

An intra predictor 540 performs intra prediction on a coding unit in an intra mode according to prediction units. An inter predictor 535 performs inter prediction by using a reference image with respect to a coding unit in an inter mode from among a current image, wherein the reference image is obtained by a reconstructed picture buffer 530 according to prediction units.

Prediction data and residue data regarding coding units of each mode, which passed through the intra predictor 540 and the inter predictor 535, are summed, so that data in a spatial domain regarding coding units of the current image 405 may be reconstructed, and the reconstructed data in the spatial domain may be output as a reconstructed image 560 through a deblocking unit 545 and an SAO performer 550. Also, reconstructed images that are stored in the reconstructed picture buffer 530 may be output as reference images.

In order for an image data decoder 230 of the video decoding apparatus 200 to decode the image data, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the inverse-quantizer 520, the inverse-transformer 525, the intra predictor 540, the inter predictor 535, the deblocking unit 545, and the SAO performer 550 may perform operations based on coding units having a tree structure for each largest coding unit.

In particular, the intra predictor 540 and the inter predictor 535 may determine a partition mode and a prediction mode of each coding unit from among the coding units according to a tree structure, and the inverse-transformer 525 may determine whether or not to split a transformation unit according to a quad-tree structure in each coding unit.

The encoding operation of FIG. 12 and the decoding operation of FIG. 13 describe in detail a videostream encoding operation and a videostream decoding operation, respectively, in a single layer. Thus, when a two or more layer video stream is encoded by the video encoding apparatus 15 of FIG. 2A, the video encoding apparatus 15 may be included in units of the layers of the video stream.

Figure 14:
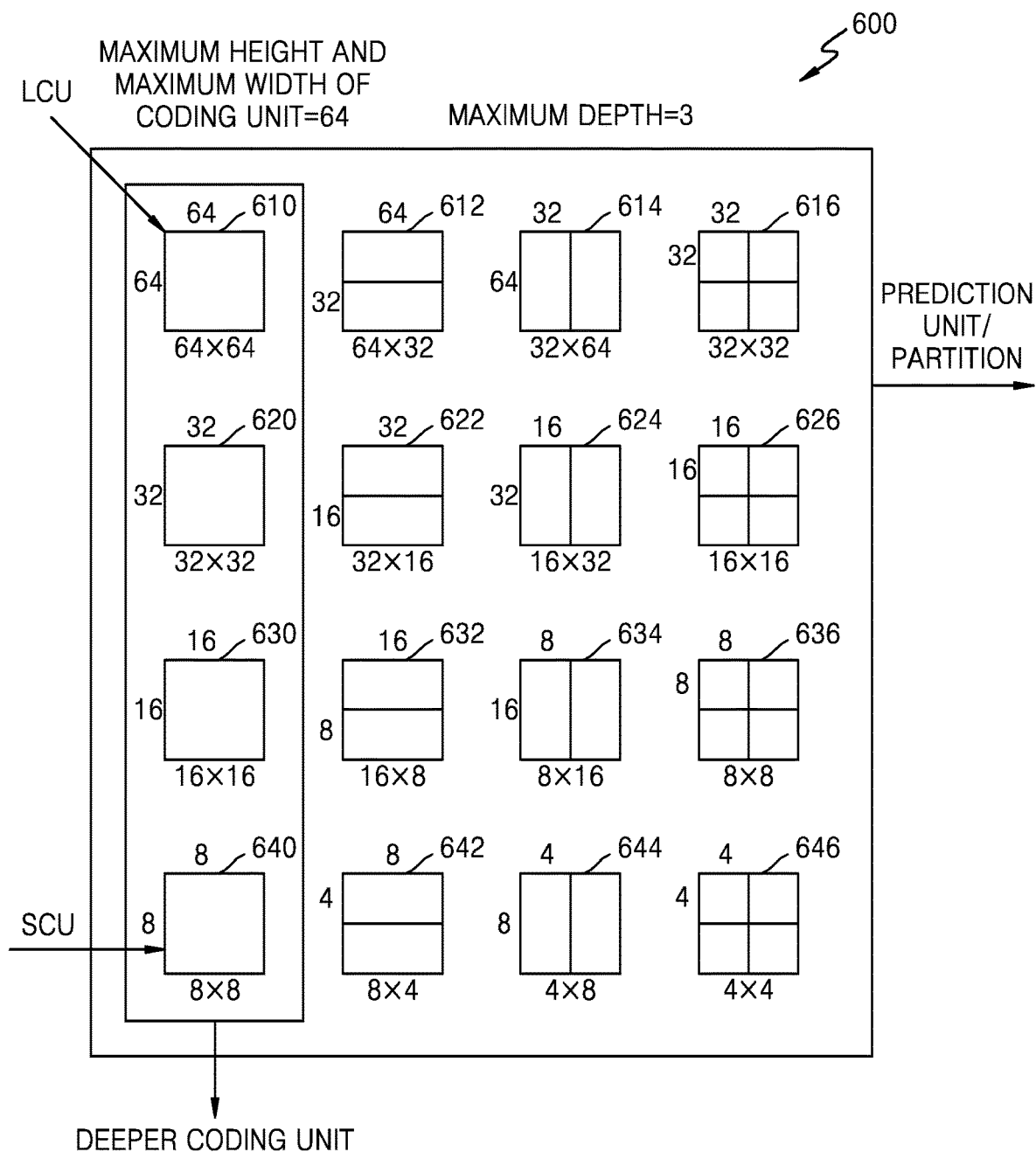
FIG. 14 illustrates deeper coding units according to depths, and partitions, according to an embodiment.

FIG. 14 illustrates coding units according to depths and partitions, according to various embodiments.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3 are present. The coding unit 640 having a size of 8×8 and a depth of 3 is a smallest coding unit.

The prediction unit and the partitions of a coding unit are arranged along the horizontal axis according to each depth. That is, if the coding unit 610 having a size of 64×64 and a depth of 0 is a prediction unit, the prediction unit may be split into partitions included in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a minimum encoding error that is a representative encoding error of a corresponding depth may be selected by performing encoding on each of prediction units of the coding units according to depths, along the horizontal axis of the hierarchical structure of coding units 600. Also, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as a depth and a partition mode of the largest coding unit 610.

Figure 15:
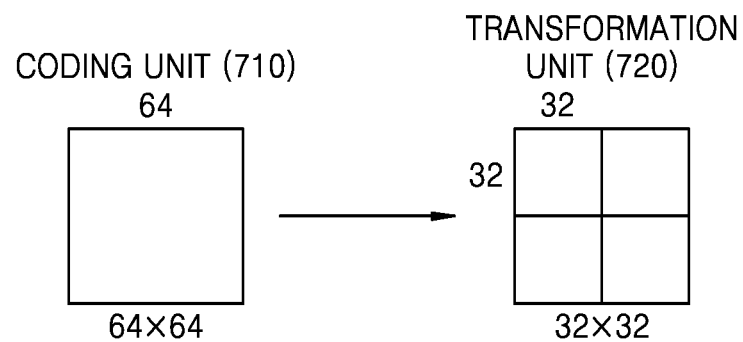
FIG. 15 illustrates a relationship between a coding unit and transformation units, according to an embodiment.

FIG. 15 illustrates a relationship between a coding unit and transformation units, according to various embodiments.

The video encoding apparatus 100 according to an embodiment or the video decoding apparatus 200 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the minimum coding error with respect to an original image may be selected.

Figure 16:
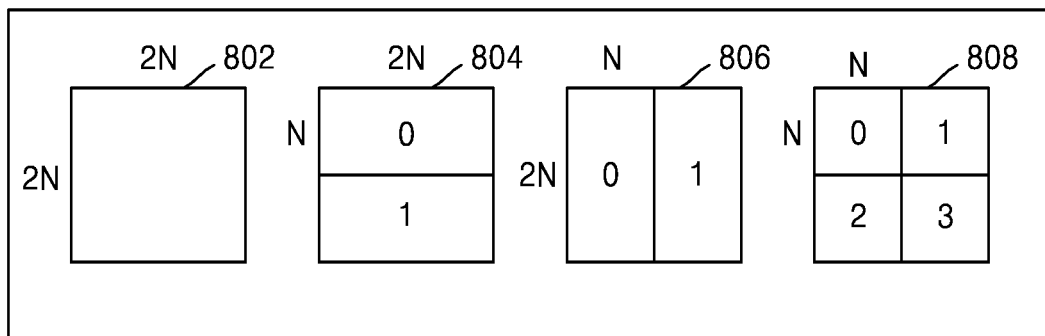
FIG. 16 illustrates a plurality of pieces of encoding information according to depths, according to an embodiment.
Figure 16:
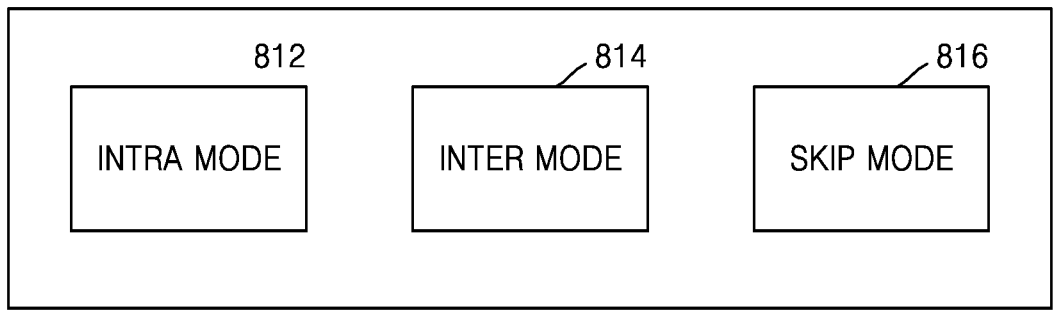
Figure 16:
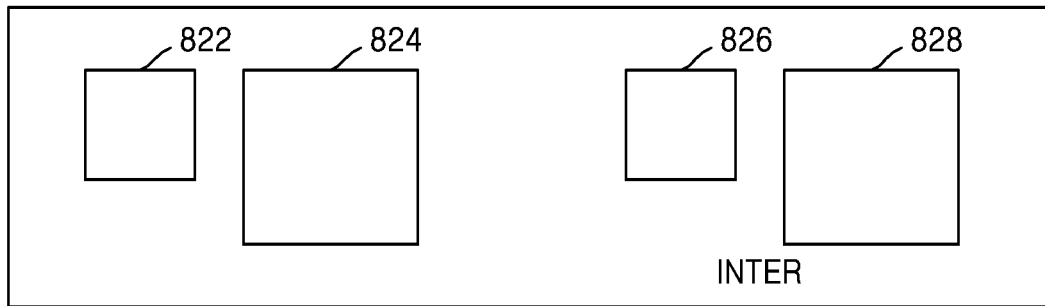

FIG. 16 illustrates a plurality of pieces of encoding information according to depths, according to various embodiments.

The output unit 130 of the video encoding apparatus 100 according to an embodiment may encode and transmit, as split information, partition mode information 800, prediction mode information 810, and transformation unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. In this case, the partition mode information 800 about a current coding unit is set to indicate one of the partition 802 having a size of 2N×2N, the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 represents a transformation unit to be based on when transformation is performed on a current coding unit. For example, the transformation unit may be one of a first intra transformation unit 822, a second intra transformation unit 824, a first inter transformation unit 826, and a second inter transformation unit 828.

The image data and encoding information extractor 220 of the video decoding apparatus 200 may extract and use the partition mode information 800, the prediction mode information 810, and the transformation unit size information 820 for each deeper coding unit.

Figure 17:
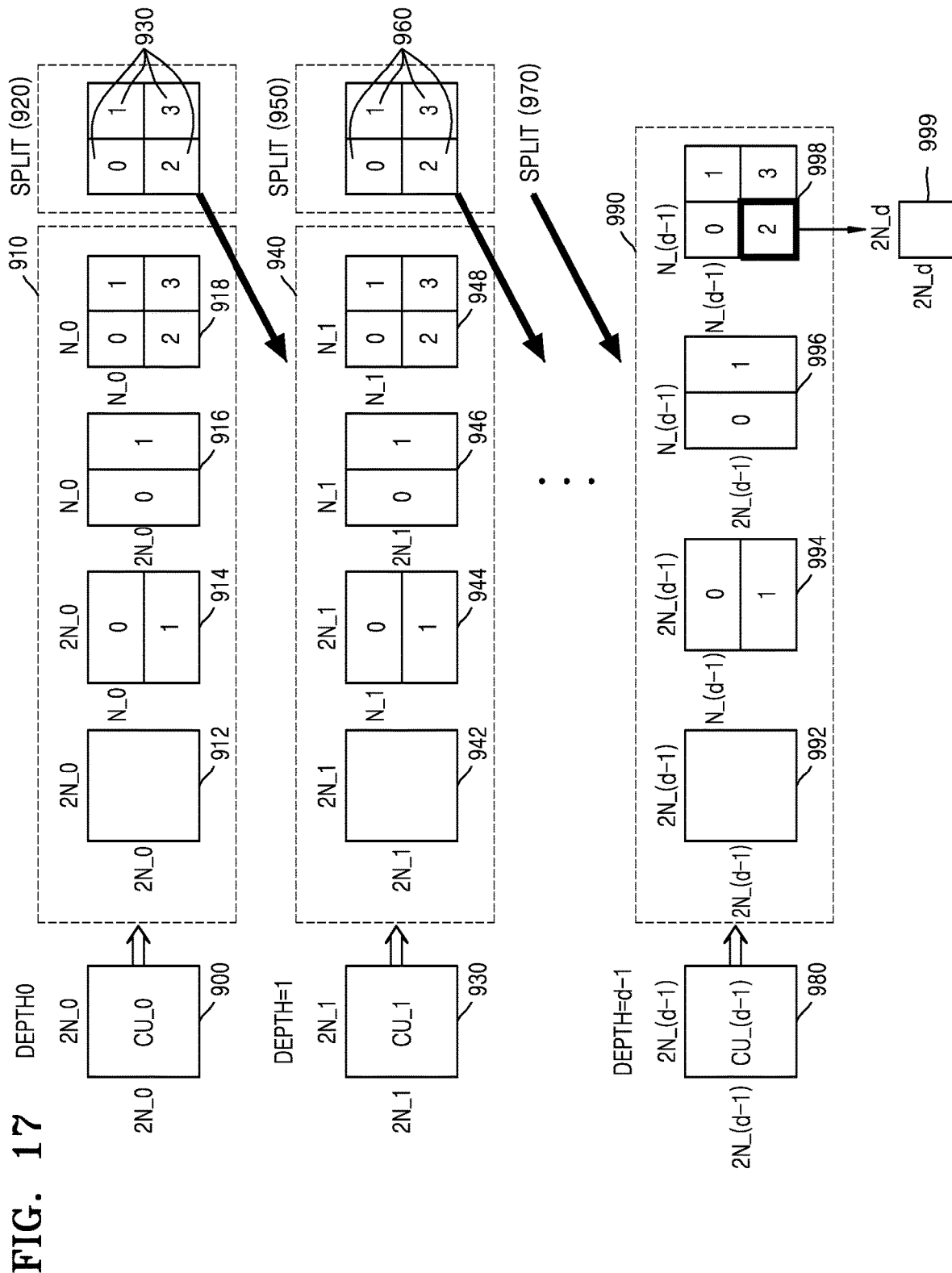
FIG. 17 illustrates deeper coding units according to depths, according to an embodiment.

FIG. 17 illustrates deeper coding units according to depths, according to various embodiments.

Split information may be used to represent a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 having the size of N_0×N_0, a depth is changed from 0 to 1 and split is performed (operation 920), and encoding may be repeatedly performed on coding units 930 of a partition mode having a depth of 2 and a size of N_0×N_0 so as to search for a minimum encoding error.

A prediction unit 940 for prediction encoding the coding unit 930 having a depth of 1 and a size of 2N_1×2N_1 (=N_0×N_0) may include a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 and split is performed (in operation 950), and encoding is repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode generating a minimum encoding error.

Even when the partition mode 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for a coding unit 952 having a depth of d−1 is not set.

A data unit 999 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 100 according to the embodiment may select a depth generating the minimum encoding error by comparing encoding errors according to depths of the coding unit 900 to determine a depth, and may set a corresponding partition mode and a prediction mode as an encoding mode of the depth.

As such, the minimum encoding errors according to depths are compared in all of the depths of 0, 1, . . . , d−1, d, and a depth having a minimum encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 220 of the video decoding apparatus 200 according to the embodiment may extract and use a depth and prediction unit information about the coding unit 900 so as to decode the coding unit 912. The video decoding apparatus 200 according to the embodiment may determine a depth, in which split information is '0', as a depth by using split information according to depths, and may use, for decoding, split information about the corresponding depth.

Figure 18:
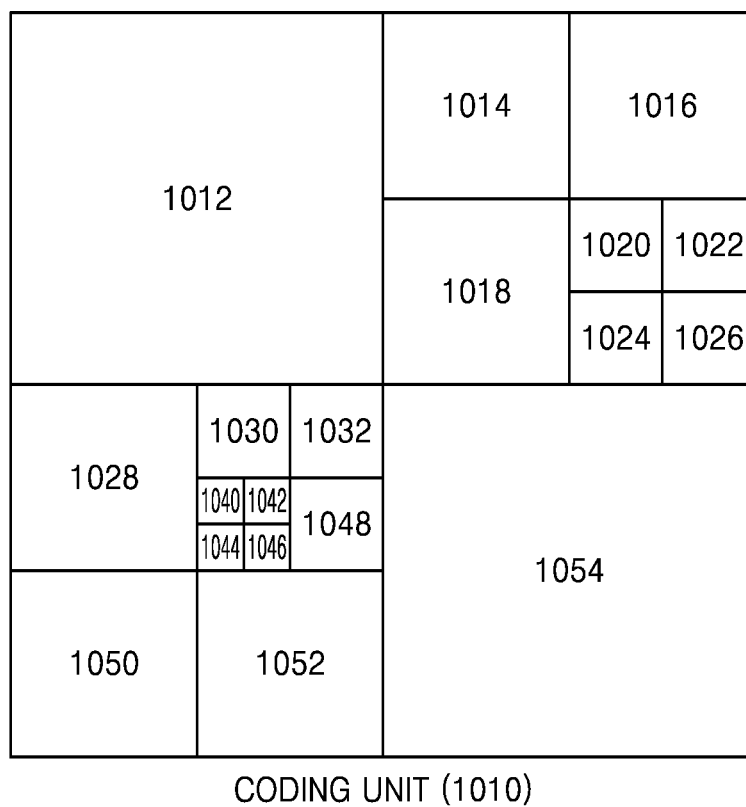
FIGS. 18, 19, and 20 illustrate a relationship between coding units, prediction units, and transformation units, according to an embodiment.
Figure 19:
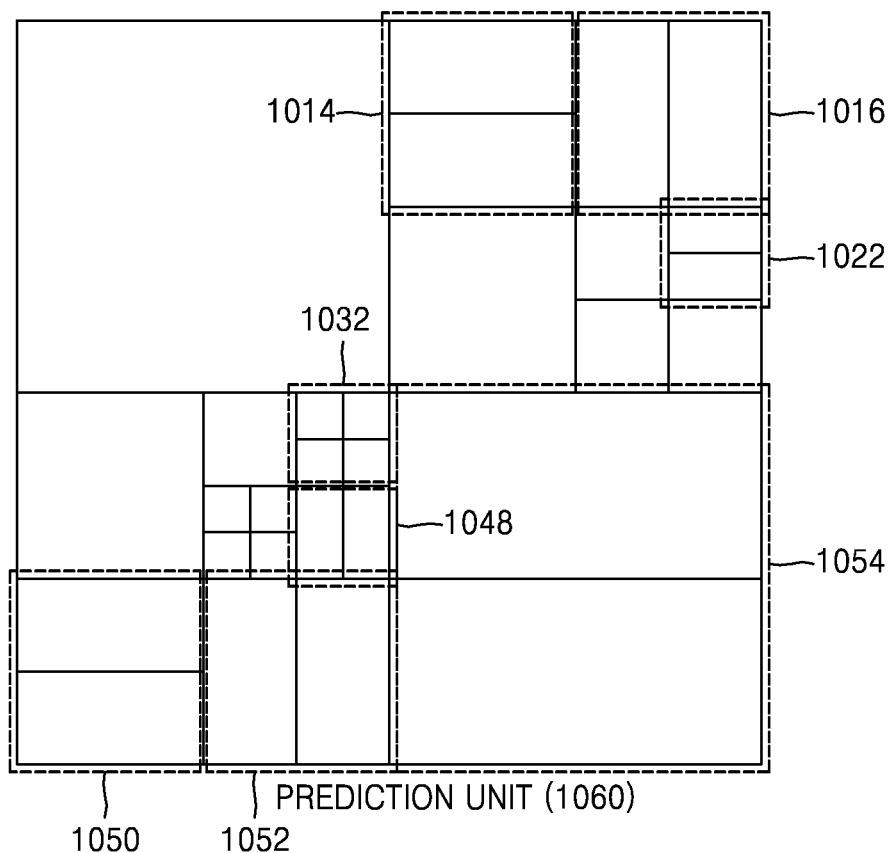
Figure 20:
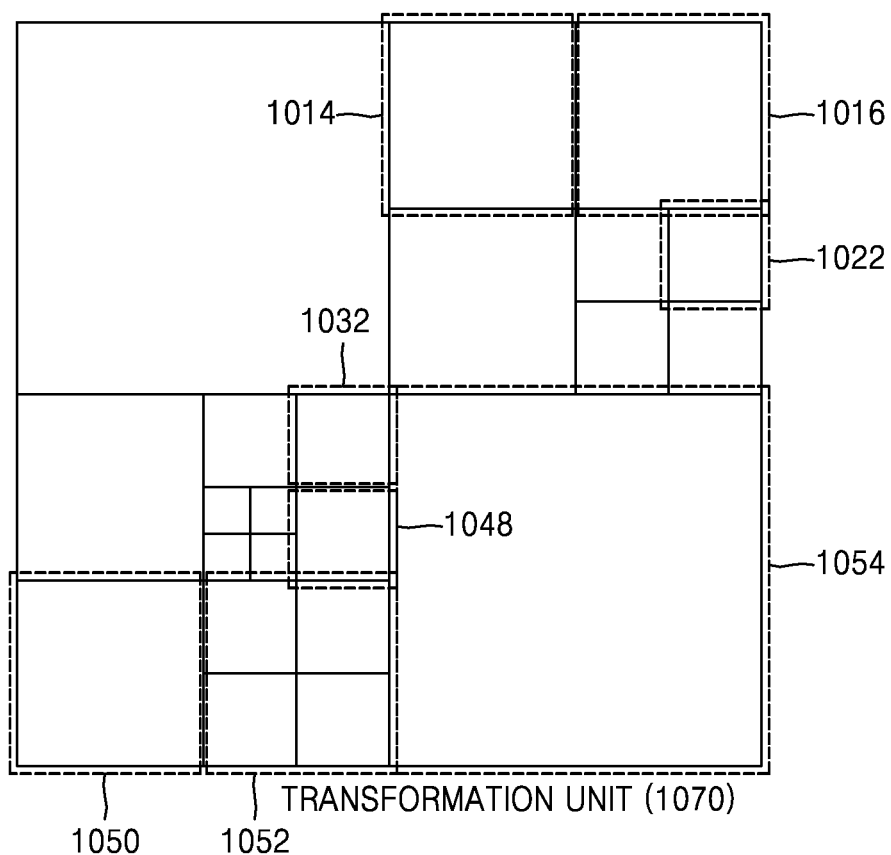

FIGS. 18, 19, and 20 illustrate a relationship between coding units, prediction units, and transformation units, according to various embodiments.

Coding units 1010 are deeper coding units according to depths determined by the video encoding apparatus 100, in a largest coding unit. Prediction units 1060 are partitions of prediction units of each of the Coding units 1010 according to depths, and transformation units 1070 are transformation units of each of the coding units according to depths.

When a depth of a largest coding unit is 0 in the deeper Coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1760 are data units different from those in the Prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition mode information, prediction mode information, and transformation unit size information. Table 1 below shows the encoding information that may be set by the video encoding apparatus 100 and the video decoding apparatus 200 according to the embodiments.

TABLE 1

| Split Information 0 (Encoding on Coding Unit having Size of 2N×2N and Current Depth of d) | | | | | Split Information 1 |
|---|---|---|---|---|---|
| Prediction Mode | Partition Type | | Size of Transformation Unit | | |
| Intra Inter Skip (Only 2N×2N) | Symmetrical Partition Mode | Asymmetrical Partition Mode | Split Information 0 of Transformation Unit | Split Information 1 of Transformation Unit | Repeatedly Encode Coding Units having Lower Depth of d + 1 |
| | 2N×2N 2N×N N×2N | 2N×nU 2N×nD nL×2N | 2N×2N | N×N (Symmetrical Partition) | |

TABLE 1-continued

| Split Information 0 (Encoding on Coding Unit having Size of 2Nx2N and Current Depth of d) | | | Split Information 1 |
|---|---|---|---|
| Prediction Mode | Partition Type | Size of Transformation Unit | |
| | NxN | nRx2N | Mode) N/2xN/2 (Asymmetrical Partition Mode) |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition modes, and the skip mode may be defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the coding unit corresponding to the same depth by comparing a plurality of pieces of encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on adjacent data units, encoding information of data units in deeper coding units adjacent to the current coding unit may be directly referred to and used.

In another embodiment, if a current coding unit is prediction-encoded based on adjacent data units, the adjacent data units may be referred to in a manner that data adjacent to the current coding unit is searched for in deeper coding units by using encoding information of the deeper coding units adjacent to the current coding unit.

Figure 21:
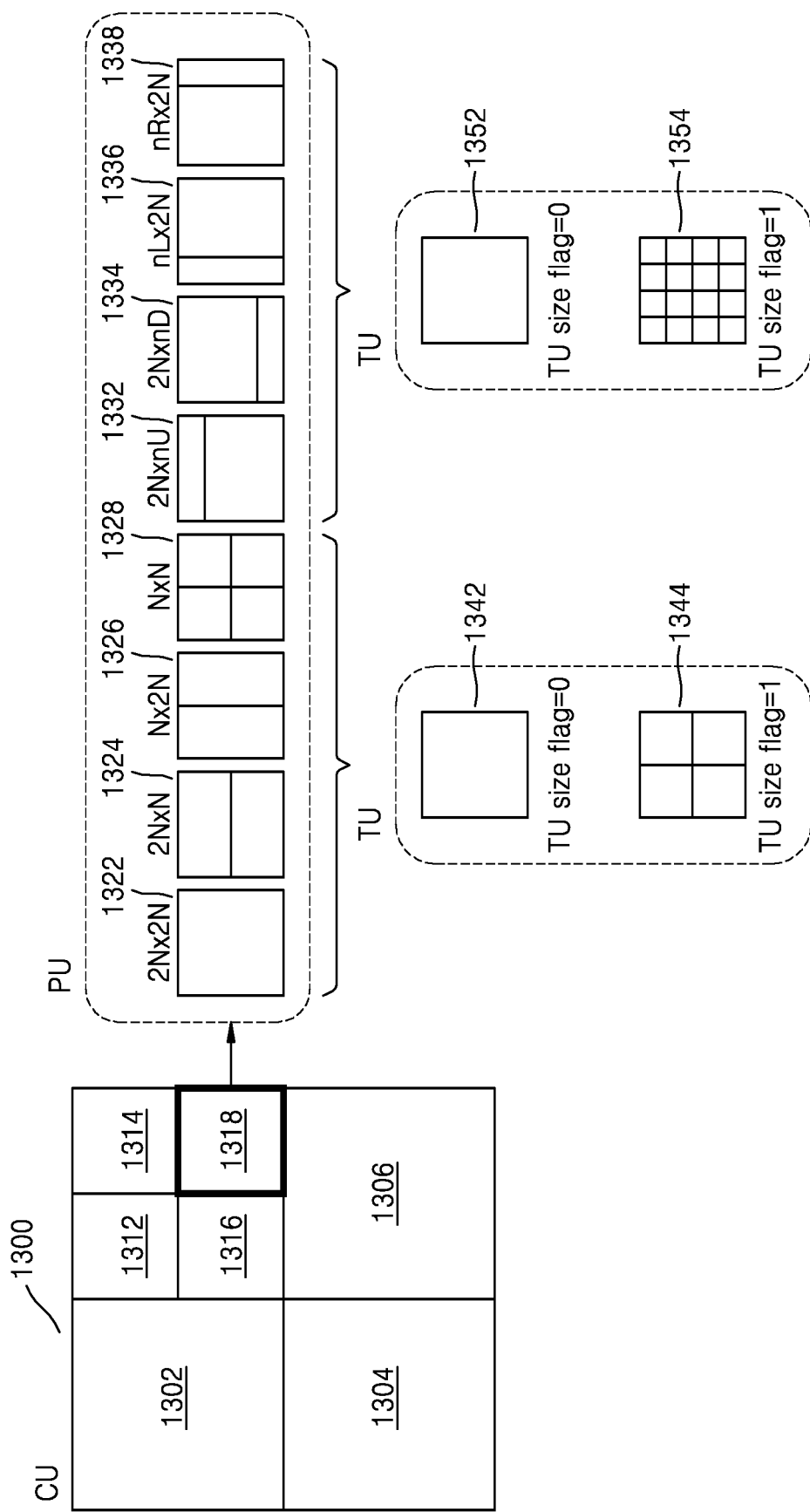
FIG. 21 illustrates a relationship between a coding unit, a prediction unit, and a transformation unit, according to encoding mode information of Table 1.

FIG. 21 illustrates a relationship between a coding unit, a prediction unit, and a transformation unit, according to encoding mode information of Table 1.

A largest coding unit 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 21 is a flag having a value of 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$CurrMinTuSize = \\ max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. 'PartitionSize' denotes the size of the current partition unit.

$$RootTuSize = min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 9 through 21, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a non-transitory computer-readable recording medium. Examples of the non-transitory computer-readable recording medium include magnetic storage media (e.g., ROM, floppy disks, hard disks, etc.), optical recording media (e.g., CD-ROMs, or DVDs), etc.

While the present disclosure has been particularly shown and described with reference to embodiments thereof, it will be understood by one of ordinary skill in the art that various changes in form and details may be made therein without departing from the spirit and scope of the following claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The invention claimed is:

1. An apparatus for decoding a video encoded based on a largest coding unit, the apparatus comprising:
a largest coding unit determiner configured to determine a plurality of largest coding units in a current picture unit by using information indicating a size of a largest coding unit; and
a decoder configured to decode the plurality of largest coding units,
wherein the decoder is further configured to determine a current coding unit included in a current largest coding unit that is one of the plurality of largest coding units, to obtain, from a bitstream, split information for the current coding unit when a size of the current coding unit is greater than a size acquired using size limit information, and to obtain, from the bitstream, partition mode information for the current coding unit when the size of the current coding unit is equal to or less than the size acquired using the size limit information,
wherein the split information indicates whether the current coding unit is split into four blocks smaller than the current coding unit, and the partition mode information indicates whether the current coding unit is split into two blocks smaller than the current coding unit,
wherein when the size of the current coding unit is equal to or less than the size acquired using the size limit information, the split information for the current coding unit is not obtained from the bitstream,
wherein the size acquired using the size limit information is equal to or greater than a minimum size allowable to the current coding unit,
wherein the size limit information is used for a plurality of coding units included in the current picture unit, and information about the minimum size allowable to the current coding unit is used for a plurality of coding units included in a current sequence unit including the current picture unit,
wherein the information indicating the size of the largest coding unit is used for a plurality of largest coding units included in the current sequence unit.

2. An apparatus for encoding a video based on a largest coding unit, the apparatus comprising:
a largest coding unit determiner configured to determine a plurality of largest coding units of a predetermined first size in a current picture unit; and
an encoder configured to encode the plurality of largest coding units,
wherein the encoder is further configured to determine a current coding unit included in a current largest coding unit that is one of the plurality of largest coding units, to generate a bitstream including split information for the current coding unit when a size of the current coding unit is greater than a predetermined second size, and to generate a bitstream including partition mode information for the current coding unit when the size of the current coding unit is equal to or less than the predetermined second size,
wherein the split information indicates whether the current coding unit is split into four blocks smaller than the current coding unit, and the partition mode information indicates whether the current coding unit is split into two blocks smaller than the current coding unit,
wherein information indicating the predetermined first size is included in the bitstream,
wherein when the size of the current coding unit is equal to or less than the predetermined second size, the split information for the current coding unit is not included in the bitstream,
wherein the predetermined second size is equal to or greater than a minimum size allowable to the current coding unit,
wherein size limit information indicating the predetermined second size is used for a plurality of coding units included in the current picture unit, and information about the minimum size allowable to the current coding unit is used for a plurality of coding units included in a current sequence unit including the current picture unit,
wherein the information indicating the predetermined first size is used for a plurality of largest coding units included in the current sequence unit.

3. A non-transitory computer-readable medium storing a computer program, wherein the computer program, when executed at a processor, implements a method for generating a bitstream, the method comprising:
determining a plurality of largest coding units of a predetermined first size in a current picture unit;
determining a current coding unit included in a current largest coding unit that is one of the plurality of largest coding units;
generating a bitstream including split information for the current coding unit when a size of the current coding unit is greater than a predetermined second size; and
generating a bitstream including partition mode information for the current coding unit when the size of the current coding unit is equal to or less than the predetermined second size,
wherein the split information indicates whether the current coding unit is split into four blocks smaller than the current coding unit, and the partition mode information indicates whether the current coding unit is split into two blocks smaller than the current coding unit,
wherein information indicating the predetermined first size is included in the bitstream,
wherein when the size of the current coding unit is equal to or less than the predetermined second size, the split information for the current coding unit is not included in the bitstream,
wherein the predetermined second size is equal to or greater than a minimum size allowable to the current coding unit,
wherein size limit information indicating the predetermined second size is used for a plurality of coding units included in the current picture unit, and information about the minimum size allowable to the current coding unit is used for a plurality of coding units included in a current sequence unit including the current picture unit,
wherein the information indicating the predetermined first size is used for a plurality of largest coding units included in the current sequence unit.

* * * * *